US012782681B2

(12) United States Patent
Komiyama

(10) Patent No.: US 12,782,681 B2
(45) Date of Patent: Nov. 3, 2026

(54) OPTICAL SYSTEM, IMAGE PICKUP APPARATUS, AND LENS APPARATUS

(71) Applicant: CANON KABUSHIKI KAISHA, Tokyo (JP)

(72) Inventor: Takahiro Komiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 260 days.

(21) Appl. No.: 18/626,407

(22) Filed: Apr. 4, 2024

(65) Prior Publication Data

US 2024/0337904 A1 Oct. 10, 2024

(30) Foreign Application Priority Data

Apr. 10, 2023 (JP) ................................ 2023-063719

(51) Int. Cl.

*G02B 9/64* (2006.01)
*G02B 7/00* (2021.01)
*G02B 9/58* (2006.01)
*G03B 17/12* (2021.01)

(52) U.S. Cl.

CPC .............. *G02B 9/64* (2013.01); *G02B 7/003* (2013.01); *G02B 9/58* (2013.01); *G03B 17/12* (2013.01)

(58) Field of Classification Search

None

See application file for complete search history.

(56) References Cited

U.S. PATENT DOCUMENTS

| | | | | |
|---|---|---|---|---|
| 11,789,247 B2 | 10/2023 | Komiyama | | |
| 2020/0409120 A1 | 12/2020 | Kubota | | |
| 2022/0137348 A1* | 5/2022 | Zhu | G02B 13/06 | 359/713 |
| 2022/0326483 A1* | 10/2022 | Tang | G02B 13/04 | |
| 2023/0020801 A1* | 1/2023 | Wang | G02B 9/62 | |
| 2023/0408797 A1 | 12/2023 | Komiyama | | |

* cited by examiner

*Primary Examiner* — Darryl J Collins

(74) *Attorney, Agent, or Firm* — Carter, DeLuca & Farrell LLP

(57) ABSTRACT

An optical system includes, in order from an object side to an image side, a first lens having negative refractive power, a second lens having positive refractive power, a third lens having positive refractive power, and a fourth lens having negative refractive power. A first lens surface on the object side of the first lens is aspheric, and the first lens surface has an area in which a curvature that is convex toward the object side increases from a central portion to a peripheral portion. Predetermined inequalities are satisfied.

26 Claims, 9 Drawing Sheets

OPTICAL SYSTEM, IMAGE PICKUP APPARATUS, AND LENS APPARATUS

BACKGROUND

Technical Field

One of the aspects of the embodiments relates to an optical system, which is suitable for a digital video camera, a digital still camera, a broadcasting camera, a film-based camera, a surveillance camera, an on-board (in-vehicle) camera, and the like.

Description of Related Art

An optical system for an image pickup apparatus has recently been demanded to have a compact and wide-angle lens with excellent optical performance in a peripheral portion of an image and a reduced overall length. The wide-angle lens generally employs a retrofocus type power arrangement in which a lens having negative refractive power is disposed on the object side of the optical system and a lens having positive refractive power is disposed on the image side of the optical system. One known retrofocus type optical system includes a meniscus lens having negative refractive power in which a ratio of a peripheral thickness to a central thickness (thickness deviation ratio) is large or a biconcave lens having negative refractive power disposed closest to the object (see U.S. Patent Application Publication No. 2020/0409120).

In the configuration of U.S. Patent Application Publication No. 2020/0409120, temperature unevenness within the lens tends to become large and the surface shape errors from designed values tend to become large in molding the lens having negative refractive power and disposed closest to the object in which the thickness deviation ratio is large. In a case where the surface shape errors become too large, performance significantly deteriorates, for example, curvature of field and distortion increase beyond the desired designed values.

SUMMARY

An optical system according to one aspect of the disclosure includes, in order from an object side to an image side, a first lens having negative refractive power, a second lens having positive refractive power, a third lens having positive refractive power, and a fourth lens having negative refractive power. A first lens surface on the object side of the first lens is aspheric, and the first lens surface has an area in which a curvature that is convex toward the object side increases from a central portion to a peripheral portion. The following inequalities are satisfied:

$$-1.50 \leq f2/f1 < -0.20$$

$$-2.40 < f4/f < -0.80$$

where f1 is a focal length of the first lens, f2 is a focal length of the second lens, f is a focal length of the optical system, and f4 is a focal length of the fourth lens.

An image pickup apparatus and a lens apparatus each having an optical system also constitute another aspect of the disclosure.

Further features of various embodiments of the disclosure will become apparent from the following description of embodiments with reference to the attached drawings.

DESCRIPTION OF THE EMBODIMENTS

Figure 1:
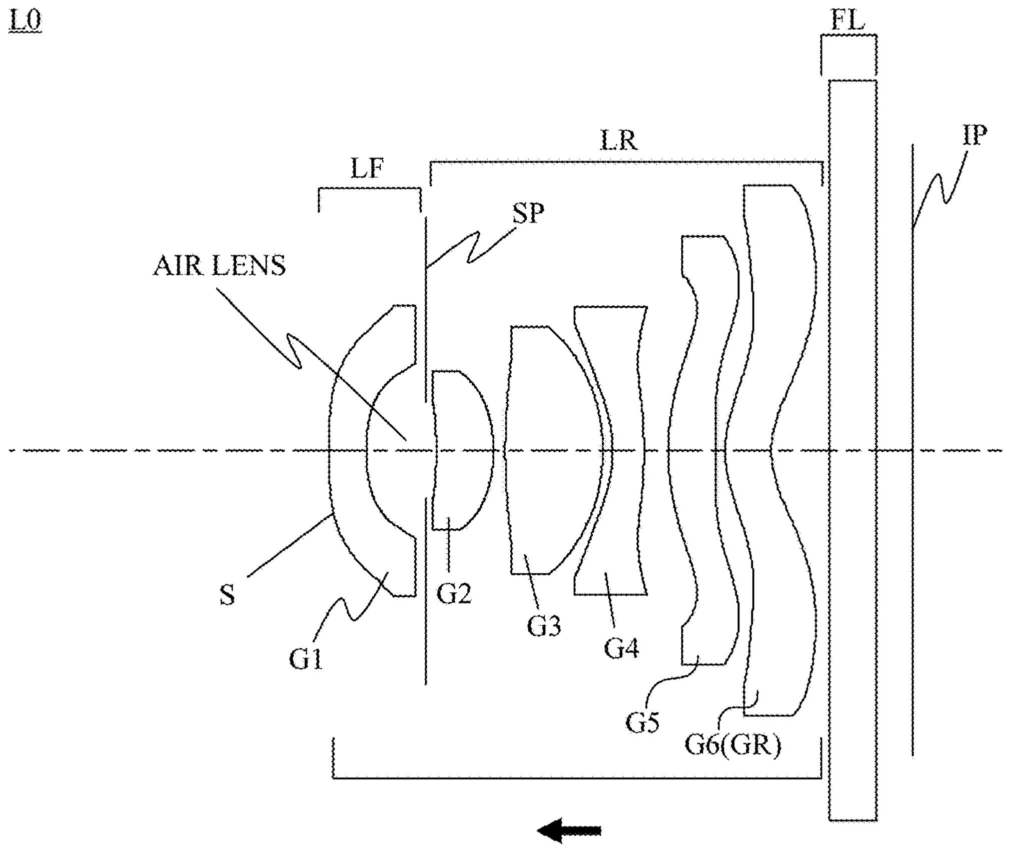
FIG. 1 is a sectional view of an optical system according to Example 1 in an in-focus state at infinity.
Figure 2:
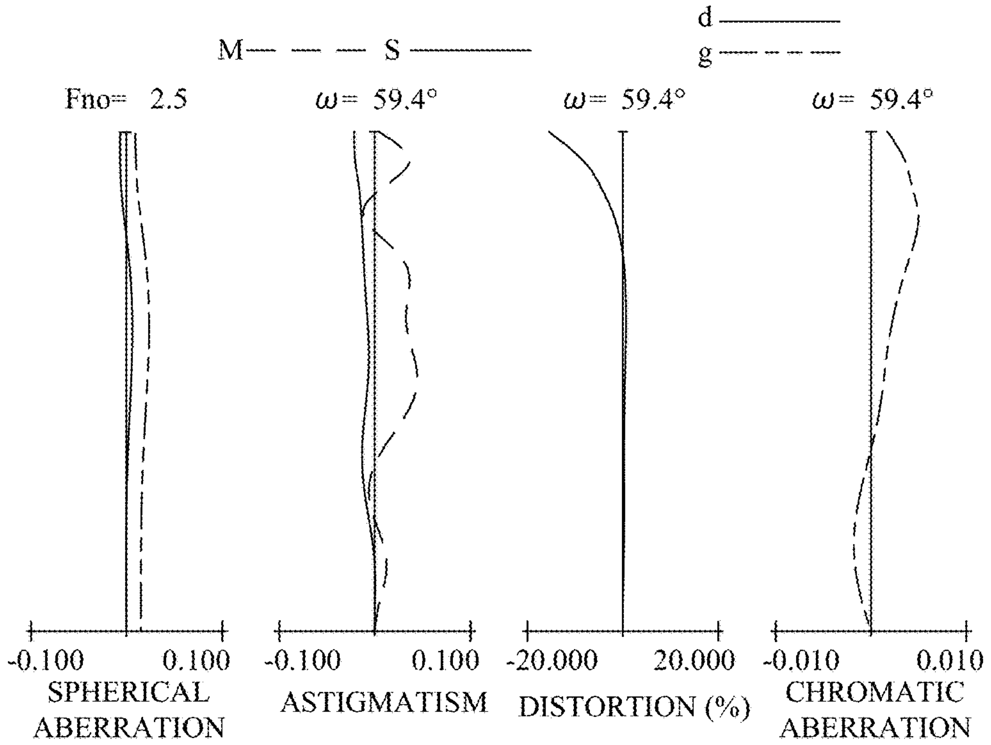
FIG. 2 is a longitudinal aberration diagram of the optical system according to Example 1.
Figure 3:
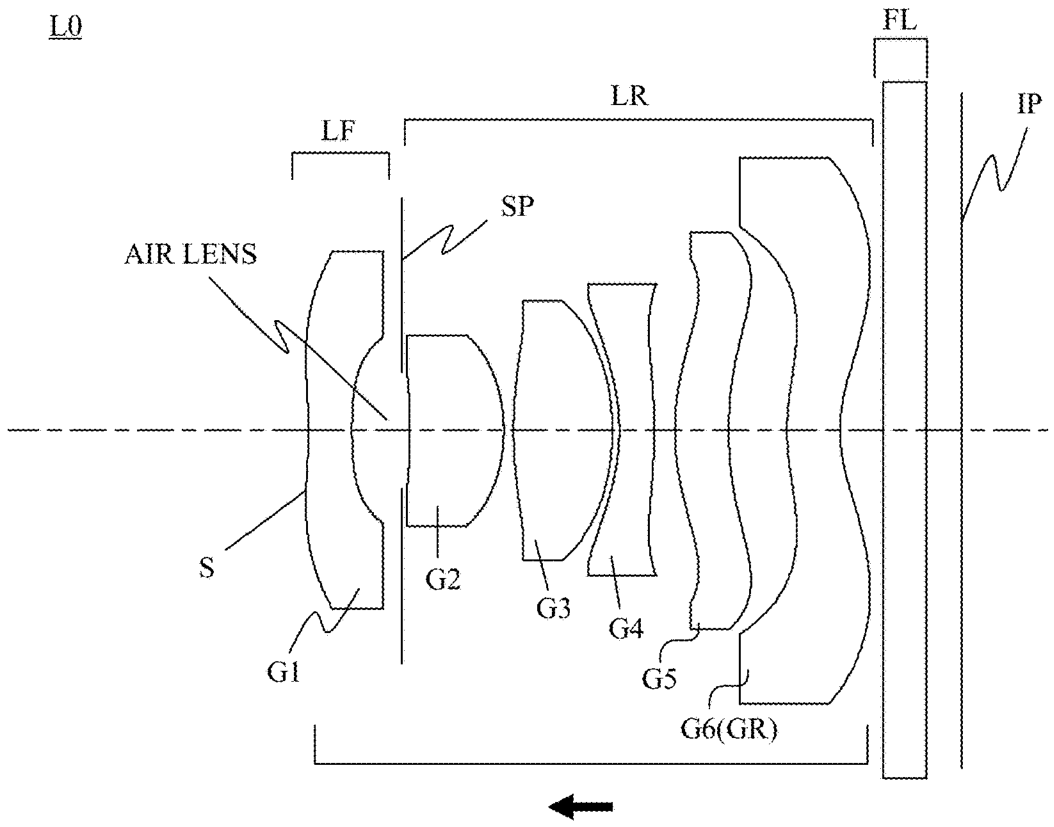
FIG. 3 is a sectional view of an optical system according to Example 2 in an in-focus state at infinity.
Figure 4:
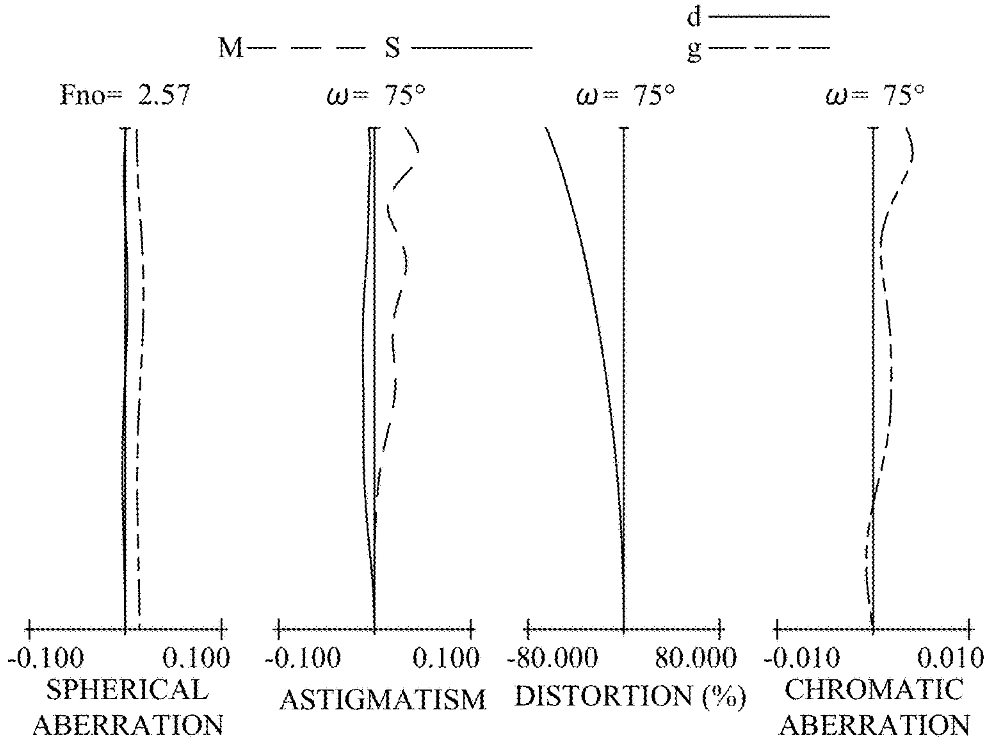
FIG. 4 is a longitudinal aberration diagram of the optical system according to Example 2.
Figure 5:
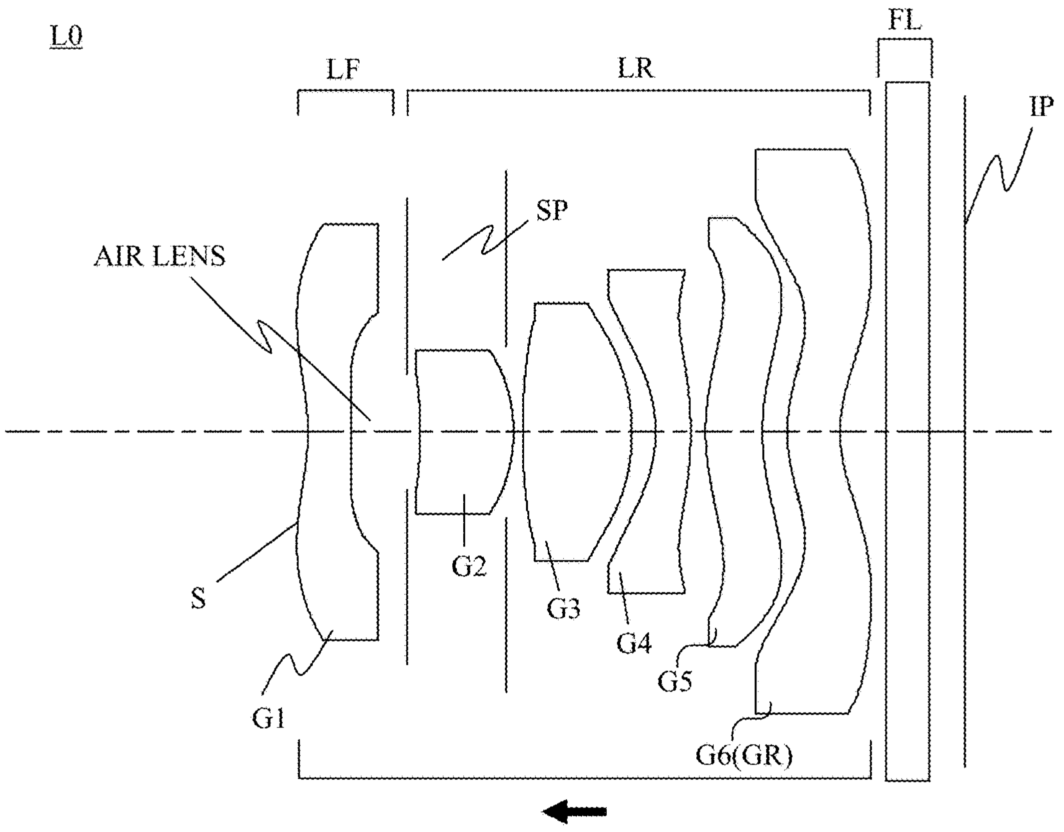
FIG. 5 is a sectional view of an optical system according to Example 3 in an in-focus state at infinity.
Figure 6:
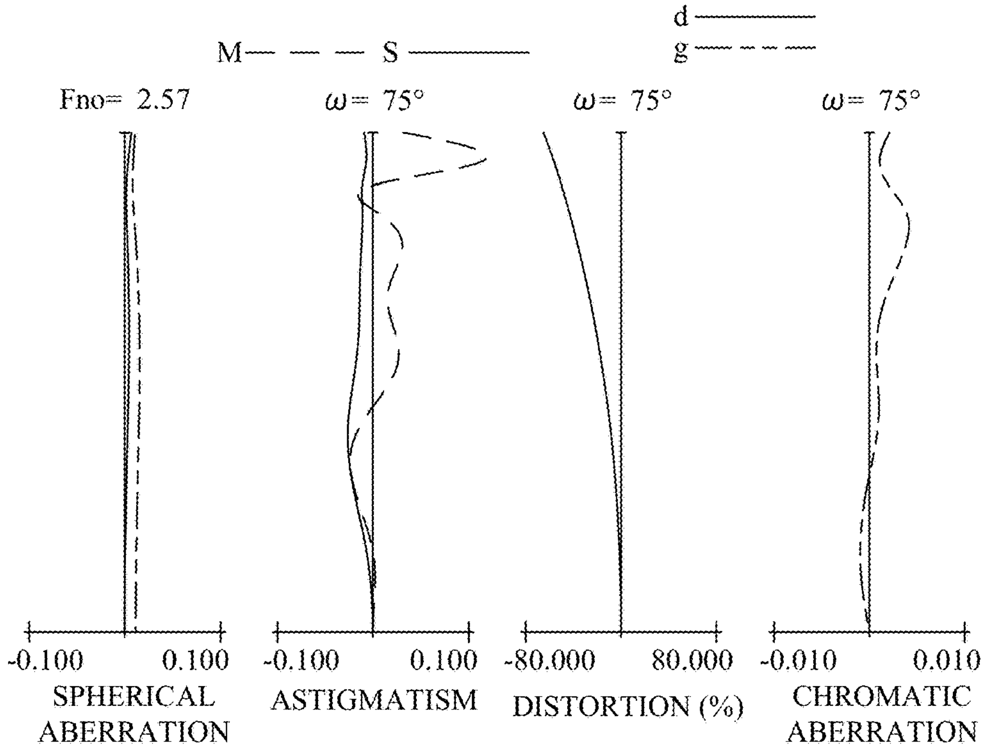
FIG. 6 is a longitudinal aberration diagram of the optical system according to Example 3.
Figure 7:
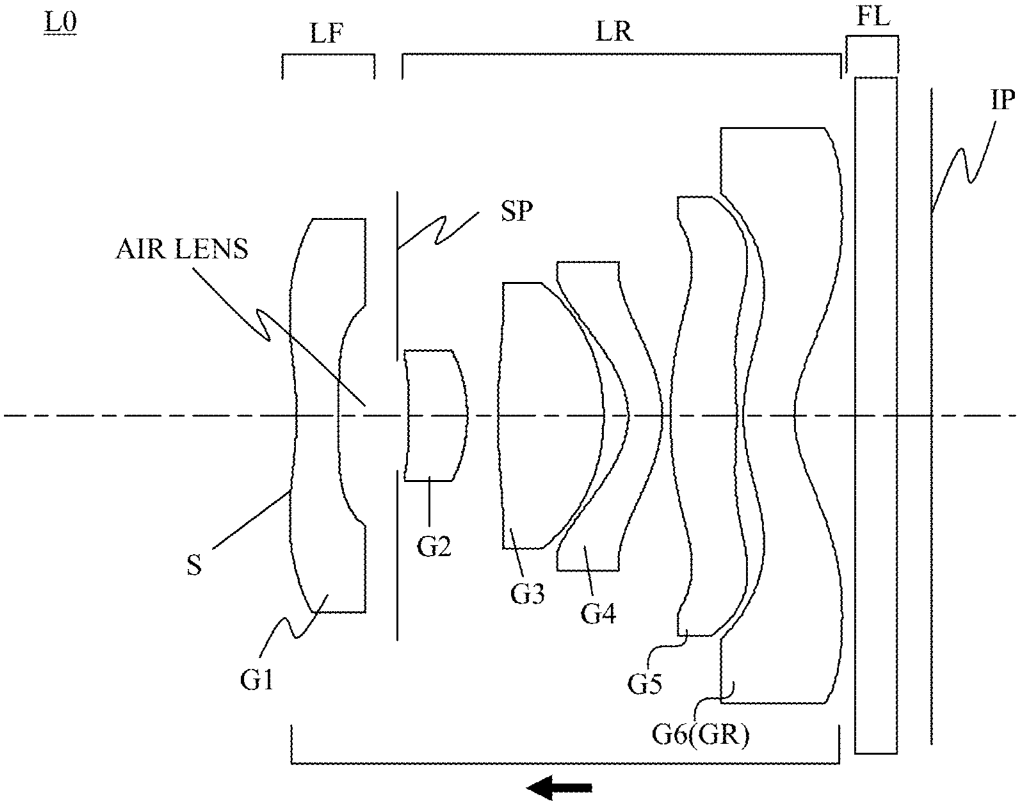
FIG. 7 is a sectional view of an optical system according to Example 4 in an in-focus state at infinity.
Figure 8:
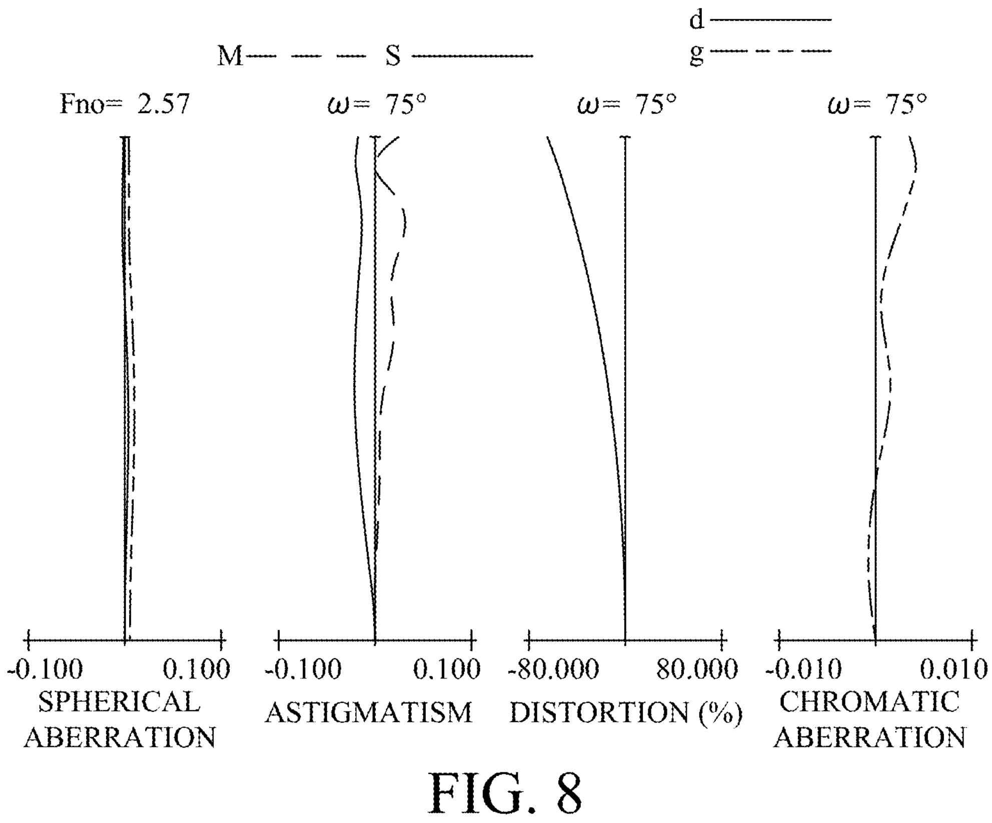
FIG. 8 is a longitudinal aberration diagram of the optical system according to Example 4.
Figure 9:
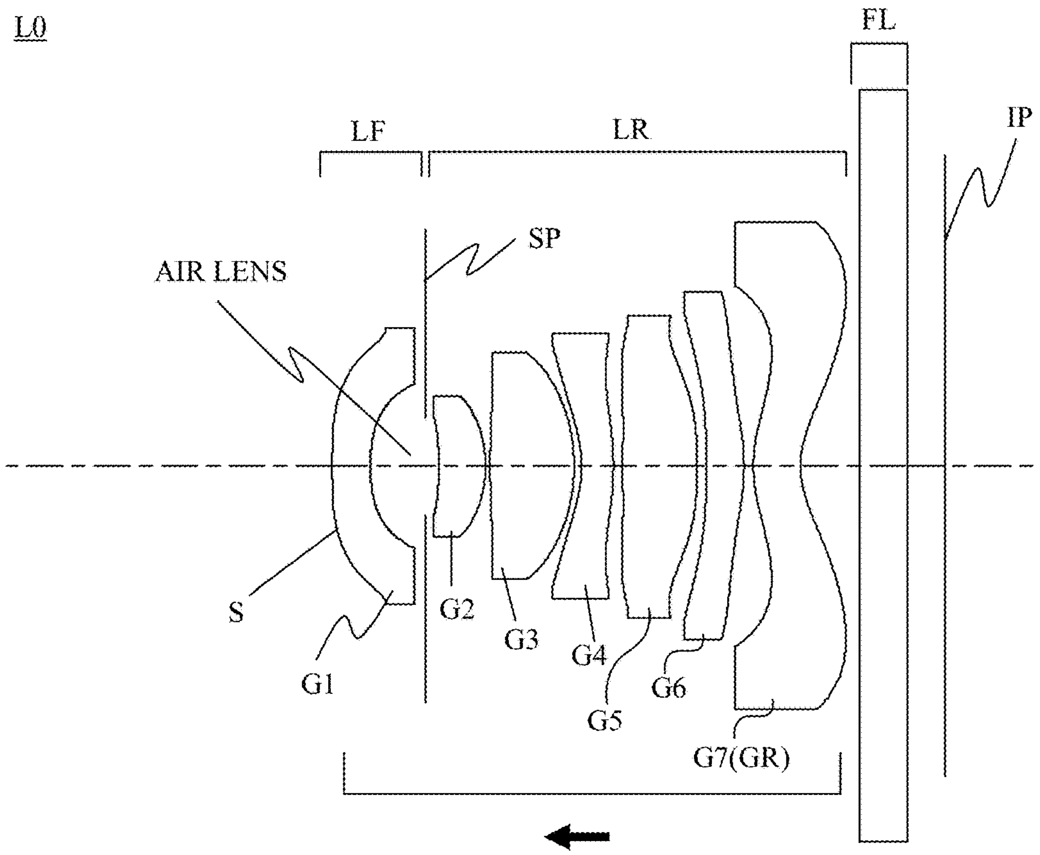
FIG. 9 is a sectional view of an optical system according to Example 5 in an in-focus state at infinity.
Figure 10:
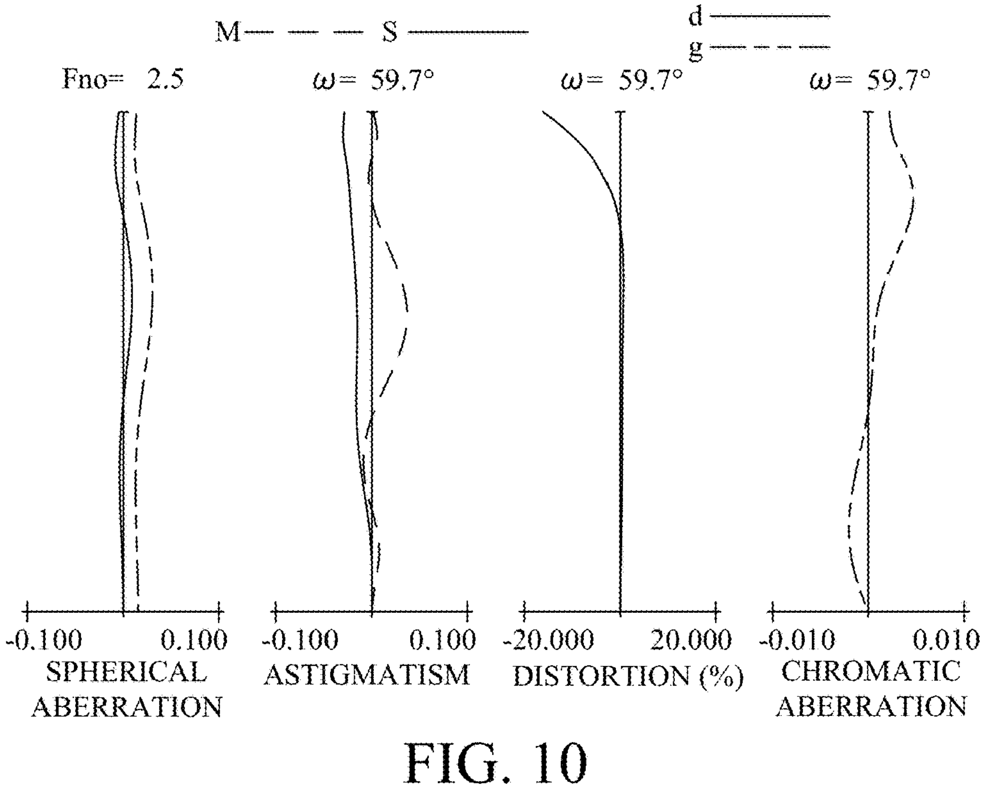
FIG. 10 is a longitudinal aberration diagram of the optical system according to Example 5.
Figure 11:
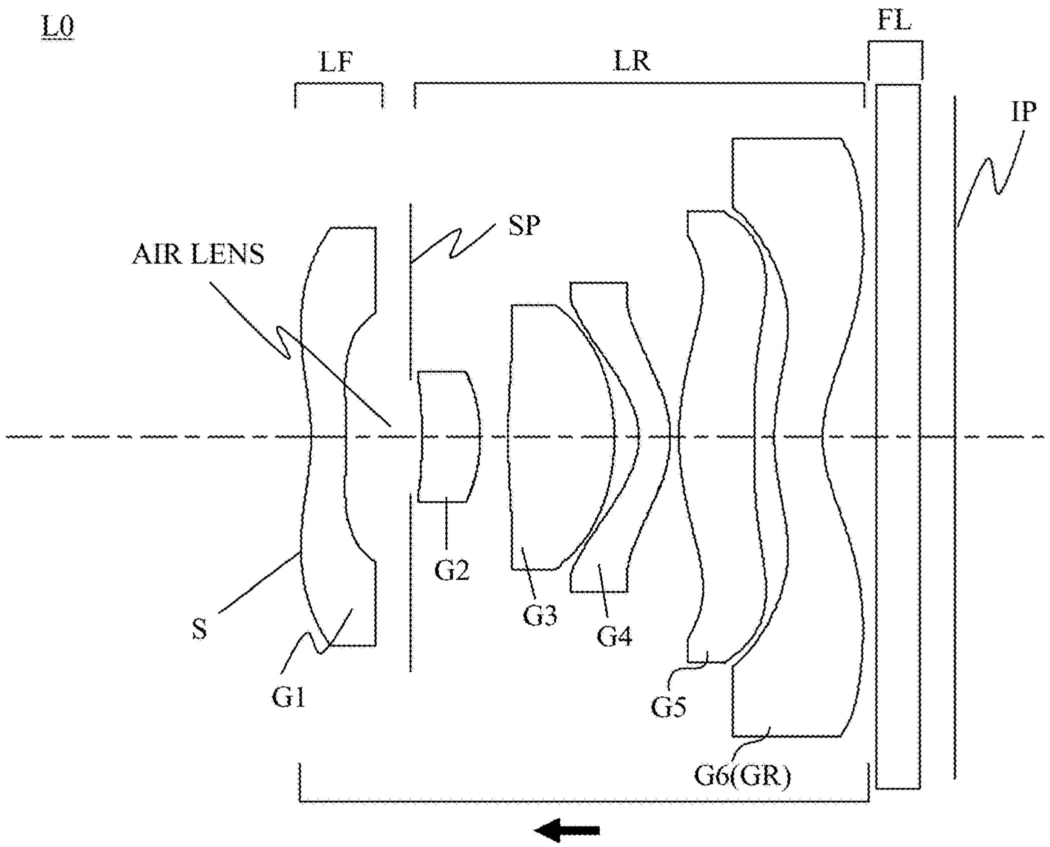
FIG. 11 is a sectional view of an optical system according to Example 6 in an in-focus state at infinity.
Figure 12:
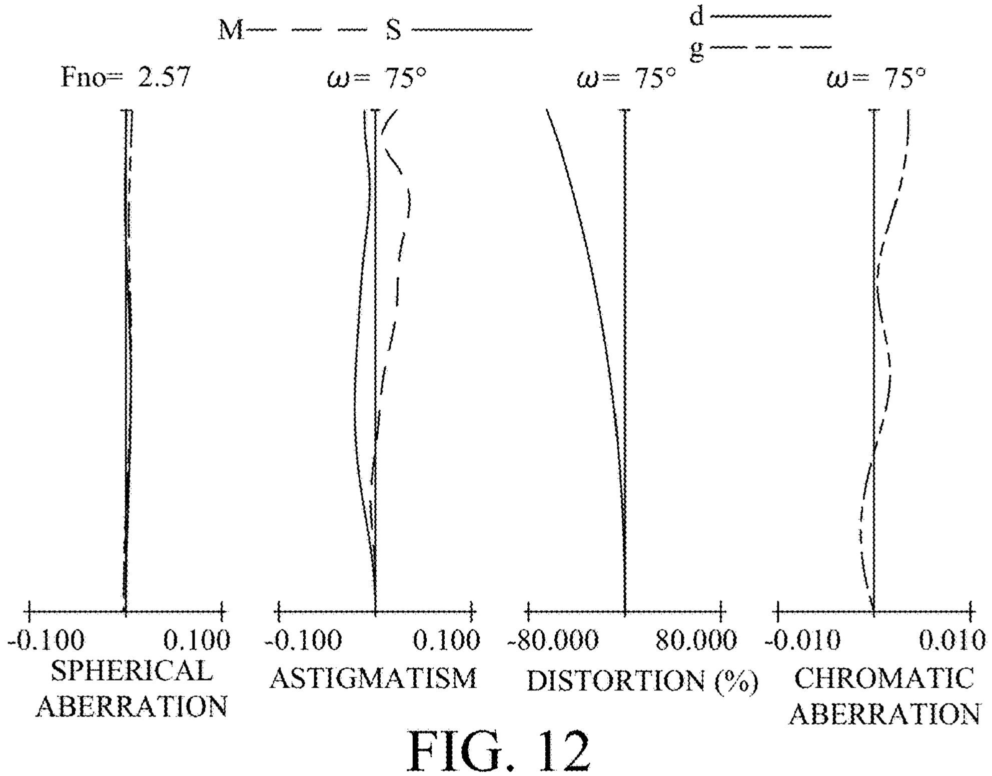
FIG. 12 is a longitudinal aberration diagram of the optical system according to Example 6.
Figure 13:
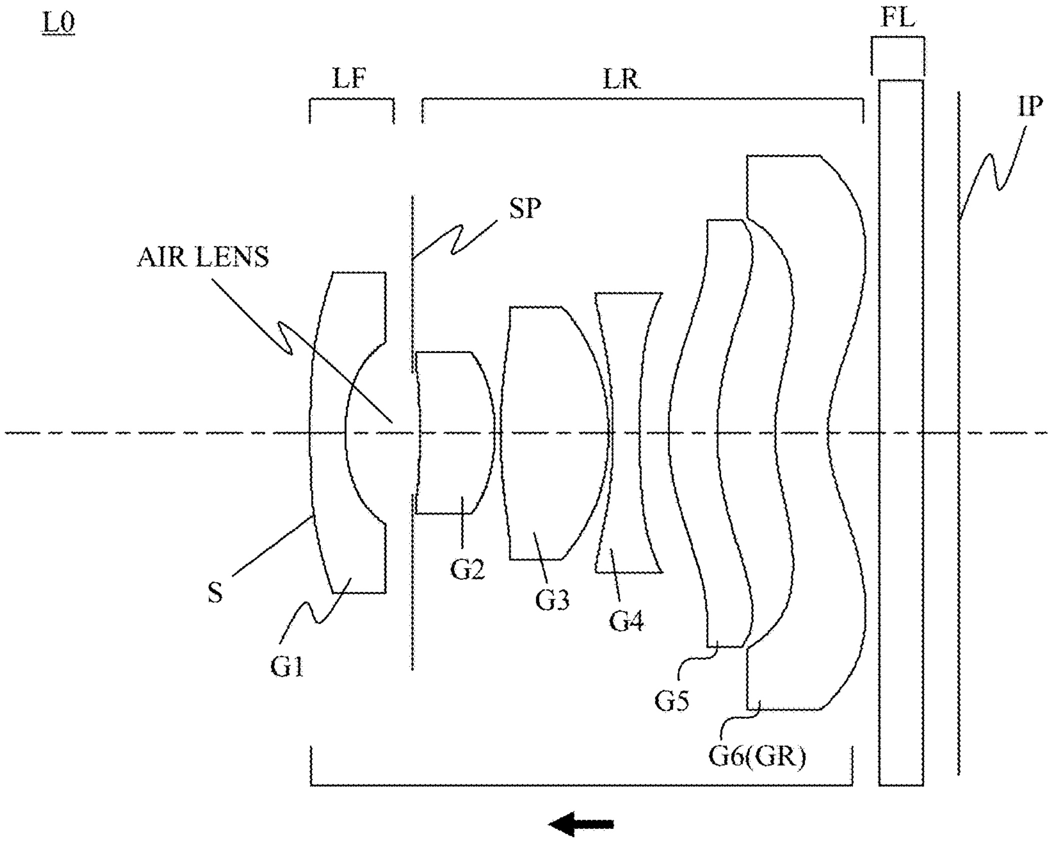
FIG. 13 is a sectional view of an optical system according to Example 7 in an in-focus state at infinity.
Figure 14:
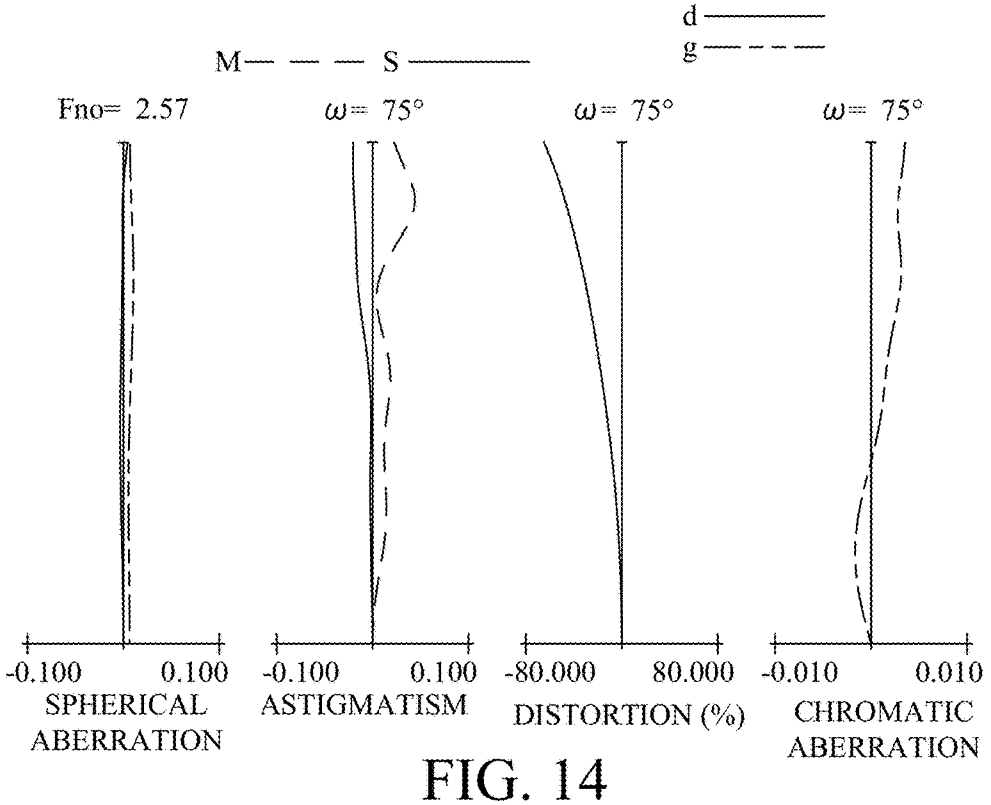
FIG. 14 is a longitudinal aberration diagram of the optical system according to Example 7.

Referring now to the accompanying drawings, a detailed description will be given of embodiments according to the disclosure. Corresponding elements in respective figures will be designated by the same reference numerals, and a duplicate description thereof will be omitted.

FIGS. 1, 3, 5, 7, 9, 11, and 13 are sectional views of optical systems L0 according to Examples 1 to 7 in an in-focus state at infinity, respectively. The optical system L0 according to each example is used in an image pickup apparatus such as a digital video camera, a digital still camera, a broadcasting camera, a film-based camera, a surveillance camera, an on-board (in-vehicle) camera, or the like.

In each sectional view, a left side is an object side and a right side is an image side. In a case where the optical system L0 according to each example is used as a projection lens for a projector or the like, a left side is a screen side and a right side is a projected image side.

The optical system L0 according to each example includes a plurality of lens units. In this specification, a group is a group of lenses partitioned by an aperture stop SP that determines an on-axis ray. The optical system L0 according to each example includes, in order from the object side to the image side, a front group LF having positive refractive power, an aperture stop SP, and a rear group LR having negative refractive power. The front group LF is a group of all lenses on the object side of the aperture stop SP. The rear group LR is a group of all lenses on the image side of the aperture stop SP. The lens unit may include one or more lenses. The lens unit may include an optical element such as an aspheric lens, a Fresnel lens, and a diffractive optical element, each of which does not paraxially have refractive power (has an infinite paraxial radius of curvature).

In each sectional view, Gi represents an i-th lens (where i is a natural number) counted from the object side. An arrow indicates a moving direction of the lens unit during focusing from infinity to a close distance. In each example, the entire optical system L0 moves from the image side to the object side during focusing from infinity to a close distance, but each example is not limited to this implementation. Focusing may be performed by moving only some lenses of the optical system L0 from the image side to the object side or from the object side to the image side. IP represents an image plane, and in a case where the optical system L0 according to each example is used as an imaging optical system for a digital still camera or a digital video camera, an imaging surface of a solid-state image sensor (photoelectric conversion element) such as a CCD sensor or a CMOS sensor is placed on the image plane IP. In a case where the optical system L0 according to each example is used as an imaging optical system of a film-based camera, a photosensitive surface corresponding to a film surface is placed on the image plane IP. FL represents an optical block, such as an optical filter, a face plate, a crystal low-pass filter, an infrared cut filter, and the like. The optical block is not regarded as a "lens" in this specification. S represents a lens surface that is an aspherical surface on the object side of an aspherical lens that satisfies an inequality described below.

FIGS. 2, 4, 6, 8, 10, 12, and 14 are longitudinal aberration diagrams of the optical systems L0 according to Examples 1 to 7 in the in-focus state at infinity, respectively. In a spherical aberration diagram, Fno represents an F-number. The spherical aberration diagram illustrates spherical aberration amounts for the d-line (wavelength 587.6 nm) and the g-line (wavelength 435.8 nm). In an astigmatism diagram, S illustrates an astigmatism amount on a sagittal image plane, and M illustrates an astigmatism amount on a meridional image surface. A distortion diagram illustrates a distortion amount for the d-line. A chromatic aberration diagram illustrates a lateral chromatic aberration amount for the g-line. ω is an imaging half angle of view (°).

A description will now be given of the characteristic configuration of the optical system L0 according to each example.

The optical system L0 according to each example includes, in order from the object side to the image side, a first lens G1 having negative refractive power, a second lens G2 having positive refractive power, a third lens G3 having positive refractive power, and at least one lens.

The first lens G1 having negative refractive power, the second lens G2 having positive refractive power, and the third lens G3 having positive refractive power arranged in order from the object side to the image side achieve a so-called retrofocus power arrangement, and in a case where the optical system L0 has a wide-angle, it becomes easy to secure the back focus.

The second lens G2 and the third lens G3 each having positive refractive power can distribute the strong positive refractive power for widening the angle of the optical system L0. This configuration can suppress spherical aberration, curvature of field, and coma, and as a result, aberration correction becomes easy.

The at least one lens disposed on the image side of the third lens G3 can correct aberrations at a position where the height of an off-axis ray is large. This configuration can selectively correct curvature of field and astigmatism generated in the second lens G2 and the third lens G3 while minimizing the influence on spherical aberration and coma.

In the optical system L0 according to each example, the lens surface on the object side (first lens surface) of the first lens G1 is aspherical, and has a shape that is more convex toward the object side at the peripheral portion.

A lens on the object side in a wide-angle lens tends to have a large ratio of the peripheral thickness to the central thickness (thickness deviation ratio). In a case where this lens is molded, for example, using glass or plastic, temperature unevenness within the lens tends to increase, and surface shape errors from the designed values tend to increase. Therefore, the lens surface on the object side of the first lens G1 set as the aspherical surface and a shape that gradually becomes more convex toward the object side in the peripheral portion can reduce the thickness deviation ratio and the manufacturing difficulty. This configuration can also generate pupil coma, increase the aperture efficiency of a peripheral light beam, and improve the peripheral light amount ratio.

The optical system L0 according to each example satisfies the following inequality (1):

$$-1.50 \leq f2/f1 < 0.00 \tag{1}$$

where f1 is a focal length of the first lens G1, and f2 is a focal length of the second lens G2.

Inequality (1) defines a relationship between the focal length of the first lens G1 and the focal length of the second lens G2. In order to reduce the thickness deviation ratio of the first lens G1, the first lens G1 is to be a negative meniscus that is convex on the object side or a biconcave lens that is weakly concave on the object side and is to have a negative focal length (a large absolute value of the negative focal length). In addition, reducing the positive focal length of the second lens G2 can provide refractive power enough to widen the angle of the optical system L0. Therefore, the value of inequality (1) may have a negative value and a large value (a negative value close to 0).

In a case where the negative refractive power of the first lens G1 increases and the value becomes lower than the lower limit of inequality (1), it becomes difficult to secure the necessary back focus, and the thickness deviation ratio of the first lens G1 increases. In a case where the positive refractive power of the second lens G2 decreases and the value becomes lower than the lower limit of inequality (1), it becomes difficult to widen the angle of the optical system L0.

In a case where the value becomes higher than the upper limit of inequality (1), it becomes difficult to secure the necessary back focus. In a case where the positive refractive power of the second lens G2 increases and the value becomes higher than the upper limit of inequality (1), spherical aberration and curvature of field generated in the second lens G2 increase in the underexposure direction.

Inequality (1) may be inequality (1a) below:

$$-1.40 \leq f2/f1 < -0.10 \tag{1a}$$

Inequality (1) may be inequality (1b) below:

$$-1.25 \leq f2/f1 < -0.20 \tag{1b}$$

Inequality (1) may be inequality (1c) below:

$$-1.10 \leq f2/f1 < -0.35 \tag{1c}$$

A description will now be given of a configuration that may be satisfied by the optical system L0 according to each example.

In the optical system L0 according to each example, the aperture stop SP may be disposed between the first lens G1 and the second lens G2. Many lenses disposed on the object side of the aperture stop SP may be beneficial to correcting distortion and curvature of field, but increase the diameters and thickness deviations of lenses located apart from the aperture stop SP in the optical axis direction. In that case, in molding the lens, surface shape errors due to temperature unevenness during molding and shrinkage tend to increase, and manufacturing becomes difficult. In a case where the second lens G2 is fitted to the first lens G1 at their respective edges (end surface portions) and the first lens G1 has a large diameter, the diameter of the second lens G2 becomes also large and the diameter of the entire optical system L0 becomes too large. Therefore, the aperture stop SP disposed between the first lens G1 and the second lens G2 and close to the first lens G1 can reduce the diameter of the first lens G1.

The optical system L0 according to each example may include, in order from the object side to the image side, a first lens G1 having negative refractive power, a second lens G2 having positive refractive power, a third lens G3 having positive refractive power, and a fourth lens G4 having negative refractive power. The optical system L0 according to each example may include, in order from the object side to the image side, a first lens G1 to a fifth lens G5 having negative, positive, positive, negative, and positive refractive powers. The optical system L0 according to each example may include, in order from the object side to the image side, a first lens G1 to a fifth lens G5 having negative, positive, positive, negative, and positive refractive powers, and a sixth lens G6.

The fourth lens G4 having negative refractive power can cancel out longitudinal chromatic aberration and spherical aberration generated in the second lens G2 and the third lens G3, and satisfactorily correct aberrations.

The fifth lens G5 having positive refractive power and the sixth lens G6, which are disposed on the image side of the fourth lens G4, can correct aberrations at a position apart from the aperture stop SP in the optical axis direction. At the position apart from the aperture stop SP in the optical axis direction, the height of an off-axis ray is large, and the on-axis and off-axis rays are sufficiently separated on each surface. Therefore, curvature of field and astigmatism can be corrected with almost no influence on spherical aberration and coma.

The fifth lens G5 having positive refractive power is likely to reduce an incident angle of an off-axis ray on the image plane, and in a case where imaging is performed with a solid-state image sensor such as a CMOS sensor, ray shielding caused by a microlens of the image sensor can be reduced.

In the optical system L0 according to each example, a lens surface on the object side of the fourth lens G4 may be concave. Thereby, an incident angle of an off-axis ray incident on the fourth lens G4 can be made small, and fluctuations in curvature of field and coma due to manufacturing errors in the surface shape can be made small.

The lens included in the optical system L0 according to each example may have an aspherical shape on at least one of the lens surface on the object side of the lens and the lens surface on the image side of the lens, and is made of plastic resin. The aspheric surface on the at least one surface of each lens can satisfactorily correct aberrations even if the optical system L0 includes a small number of lenses, and the optical system L0 can be made thinner. Moreover, making each lens of plastic resin can reduce the weight of the optical system L0. In a case where each lens is molded, the aspheric surface amount relative to the spherical surface can be increased so as to greatly change the refractive power near the optical axis and the peripheral portion of each surface, and the aberration correcting effect can be enhanced.

In the optical system L0 according to each example, the lens (last lens) GR disposed closest to the image plane may have a stationary point on its lens surface on the object side, a convex shape near the optical axis, and a concave shape at the peripheral portion, and its lens surface on the image side may have a stationary point, a concave shape near the optical axis, and a convex shape at the peripheral portion. The lens surface on the object side having the convex shape near the optical axis and the concave shape at the peripheral portion can suppress aberrations in the sagittal direction and the peripheral portion having the concave shape can generate curvature of field in the overexposure direction. Thereby, the curvature of field can be satisfactorily corrected that occurs in the underexposure direction in the second lens G2 and the third lens G3. In addition, the lens surface on the image side having the concave shape near the optical axis and the convex shape at the peripheral portion can correct the Petzval sum using the negative refractive power near the optical axis, and relax the incident angle of an off-axis ray on the image plane using the convex refractive power at the peripheral portion.

The stationary point is a position (separated by a predetermined distance h) where a value of a first derivative dX(h)/dh becomes 0, which first derivative is a function obtained by differentiating once, using the predetermined h, a sag amount (displacement amount) X(h) on the optical axis between a position on an aspheric surface separated from the optical axis by the predetermined distance h in the direction orthogonal to the optical axis and the surface vertex.

In the optical system L0 according to each example, the lens surface on the object side of the second lens G2 may have a concave shape on the object side. Since the second lens G2 is disposed near the aperture stop SP, the on-axis and off-axis rays pass through the second lens G2 so that they overlap each other within the surface of the second lens G2. At this position, curvature of field and coma are likely to fluctuate due to surface shape manufacturing errors. However, in a case where the lens surface on the object side of the second lens G2 has a concave shape, the incident angle of an off-axis ray on the lens surface on the object side of the second lens G2 can be relaxed, and a refraction amount of the off-axis ray can be reduced in the second lens G2. Thereby, the influence on performance due to surface shape manufacturing errors can be reduced.

In the optical system L0 according to each example, the first lens G1 and the lens GR disposed closest to the image plane may be made of plastic resin. The optical system L0 using plastic resin can become lightweight.

A description will now be given of conditions that may be satisfied by the optical system L0 according to each example. The optical system L0 according to each example may satisfy one or more of the following inequalities (2) to (17):

$$0.05 < x1/T < 0.80 \quad (2)$$

$$0.08 < T/TTL < 0.25 \quad (3)$$

$$0.40 < Dsum/TTL < 0.85 \quad (4)$$

$$-3.50 < f1/f < -0.80 \quad (5)$$

$$0.40 > f3/f2 < 1.50 \quad (6)$$

$$-3.00 < f4/f < -0.80 \quad (7)$$

$$0.001 < f/f5 < 1.500 \quad (8)$$

$$-3.00 < (G2R2 + G2R1)/(G2R2 - G2R1) < -0.40 \quad (9)$$

$$-10.00 < G2R1/f < -0.80 \quad (10)$$

$$-1.50 < f/\text{fair} < 0.00 \quad (11-1)$$

$$0.00 < f/\text{fair} < 0.30 \quad (11-2)$$

$$-1.00 < f23/f1 < -0.10 \quad (12)$$

$$1.5000 < n1 < 1.6000 \quad (13)$$

$$45 < vd1 < 65 \quad (14)$$

$$1.580 < nR < 1.750 \quad (15)$$

$$15 < vdR < 30 \quad (16)$$

$$0.25 < h/TR < 0.65 \quad (17)$$

Here, x1 is a sag amount of the lens surface S, which is an aspherical surface on the object side of the first lens G1. T is a distance on the optical axis from the surface vertex of the lens surface S to the aperture stop SP. TTL is a distance on the optical axis from the lens surface on the object side of the first lens G1 to the image plane (overall optical length). Dsum is a total thickness of lenses included in the optical system L0 (distance on the optical axis from the lens surface on the object side of the optical system L to the lens surface on the image side of the optical system L). f is a focal length of the optical system L0. f1, f2, f3, f4, and f5 are focal lengths of the first lens G1, the second lens G2, the third lens G3, the fourth lens G4, and the fifth lens G5, respectively. G2R1 is a radius of curvature of the lens surface on the object side of the second lens G2. G2R2 is a radius of curvature of the lens surface on the image side of the second lens G2. fair is a focal length of an air lens including a lens surface (second lens surface) on the image side of the first lens G1, a lens surface (third lens surface) on the object side of the second lens G2, and an air gap (air distance) between these two lens surfaces. f23 is a combined focal length of the second lens G2 and the third lens G3. n1 is a refractive index of the first lens G1. vd1 is an Abbe number of the first lens G1. nR is a refractive index of the lens GR disposed closest to the image plane. vdR is an Abbe number of the lens GR disposed closest to the image plane. h is a distance in the direction orthogonal to the optical axis from the optical axis to a stationary point on the lens surface on the image side of the lens GR disposed closest to the image plane. TR is a distance on the optical axis from the aperture stop SP to the lens surface on the image side of the lens GR disposed closest to the image plane.

Figure 15:
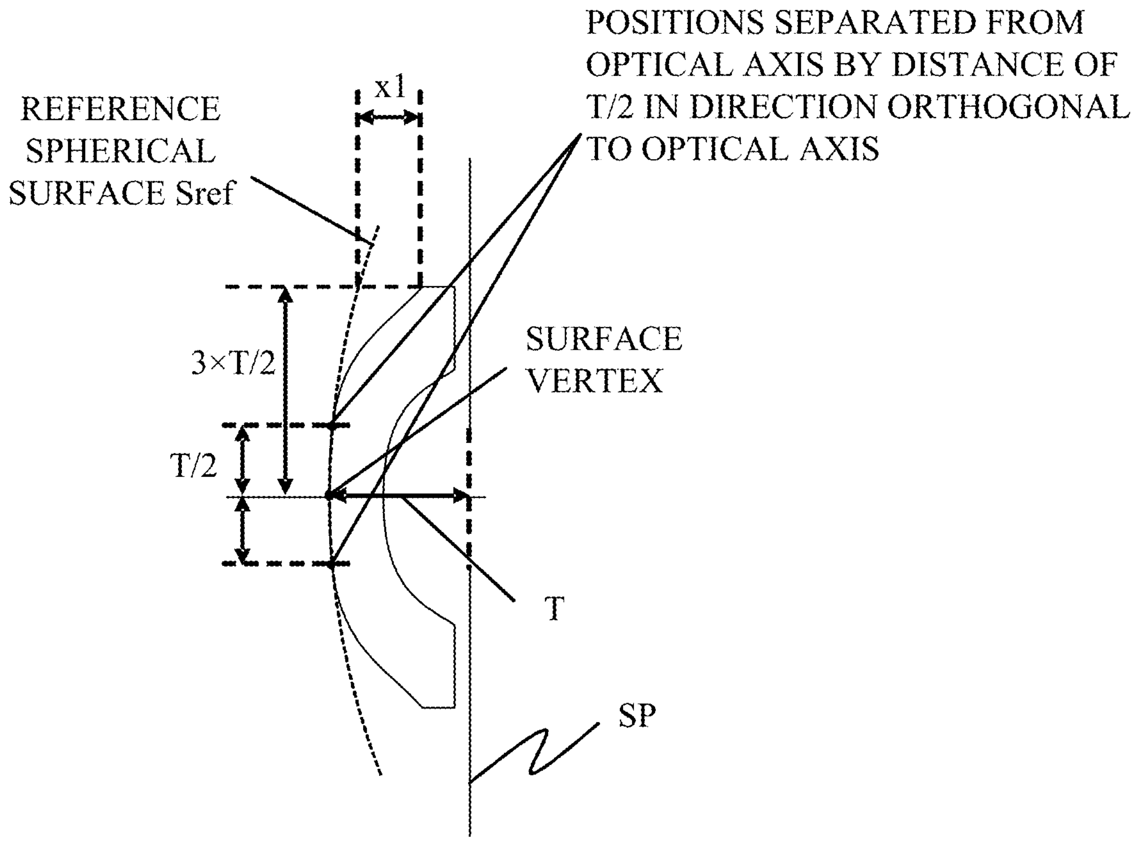
FIG. 15 explains a reference spherical surface and a sag amount.

Referring now to FIG. 15, a description will be given of the sag amount x1 of the lens surface S, which is the aspherical surface on the object side of the first lens G1. In finding the sag amount x1, first, a reference spherical surface Sref is found for the lens surface S. Where Tis the distance on the optical axis from the surface vertex of the lens surface S to the aperture stop SP, the reference spherical surface Sref is a spherical surface that passes through the surface vertex on the lens surface S and a position on the lens surface S separated from the optical axis by a distance of T/2 in the direction orthogonal to the optical axis. The position on the lens surface S separated from the optical axis by the distance of T/2 in the direction orthogonal to the optical axis is expressed as two points on the lens section in FIG. 15, but it includes all positions on a concentric circle on the lens surface S separated from the optical axis by the distance of T/2. The sag amount x1 is a distance on the optical axis between a position on the reference spherical surface Sref separated from the optical axis by a distance of 3×T/2 in the direction orthogonal to the optical axis, and a position on the lens surface S separated from the optical axis by the distance of 3×T/2 in the direction orthogonal to the optical axis. The sign of the sag amount x1 is positive in a case where the lens surface S is located on the image side of the reference spherical surface Sref.

Inequality (2) defines the sag amount on the lens surface S. The lens surface S having weak positive or negative refractive power near the optical axis provides the entire first lens G1 with negative refractive power, and the optical system L0 with a retrofocus type power arrangement. In a case where the lens surface S has weak positive or negative refractive power, the thickness of the peripheral portion of the first lens G1 tends to be larger than the central thickness of the first lens G1, and the problem of the thickness deviation ratio becomes significant. Satisfying inequality (2) can increase the actual sag amount of the lens surface S relative to the reference spherical surface defined near the optical axis of the lens surface S, and provide the lens surface S with a strongly convex shape at the peripheral portion. Thereby, the thickness deviation ratio can be reduced. In addition, satisfying inequality (2) can generate pupil coma and improve the peripheral light amount. In a case where the sag amount decreases and the value becomes lower than the lower limit of inequality (2), the thickness deviation ratio increases, manufacturing becomes difficult, and the peripheral light amount decreases. In a case where the sag amount increases and the value becomes higher than the upper limit of inequality (2), an opening angle around the lens surface S (an angle of a tangent line contacting the lens surface S) becomes too large, processing a mold that is used for molding or post-molding measurement becomes difficult.

Inequality (3) is a relationship between the distance on the optical axis from the lens surface on the object side of the first lens G1 to the aperture stop SP and the distance on the optical axis from the lens surface on the object side of the first lens G1 to the image plane. stipulates. In a case where the distance on the optical axis from the lens surface on the object side of the first lens G1 to the aperture stop SP decreases and the value becomes lower than the lower limit of inequality (3), off-axis rays passing through the first lens G1 near the optical axis, and the off-axis aberration correcting effect reduces. In a case where the distance on the optical axis from the lens surface on the object side of the first lens G1 to the aperture stop SP increases and the value becomes higher than the upper limit of inequality (3), the diameter of the first lens G1 becomes too large, and the size of the optical system L0 increases.

Inequality (4) defines a relationship between the total thickness of the lenses included in the optical system L0 and the overall optical length. In order to reduce the thickness of the optical system L0, the lenses may be disposed so that the air gap between the lenses is minimized for the overall optical length. Therefore, a ratio of the total lens thickness to the overall optical length has a large value. In a case where the total thickness decreases or the overall optical length increases, and thereby the value becomes lower than the lower limit of inequality (4), the optical system L0 becomes too long in the optical axis direction. In a case where the total thickness increases or the overall optical length decreases, and thereby the value becomes lower than the upper limit of inequality (4), the back focus of the optical system L0 becomes too small, and a sensor, an optical filter, and the like cannot be disposed. The air gap between the lenses becomes too small, and it becomes difficult to dispose a ray cut mask for ghost reduction and a mechanical member for holding a lens.

Inequality (5) defines the focal length f1 of the first lens G1. The first lens G1 is to have negative refractive power not too strong in order to reduce the thickness deviation ratio as described above, and inequality (5) defines the range. Satisfying inequality (5) can widen the angle of the optical system L0. In a case where the focal length of the first lens G1 decreases and the value becomes lower than the lower limit value of inequality (5), the negative refractive power of the first lens G1 becomes too small, and it becomes difficult to secure the necessary back focus. In a case where the focal length of the first lens G1 increases and the value becomes higher than the upper limit of inequality (5), the thickness deviation ratio of the first lens G1 becomes too large and manufacturing becomes difficult. In addition, the barrel-shaped distortion generated in the first lens G1 becomes too large.

Inequality (6) defines a relationship between the focal length of the second lens G2 and the focal length of the third lens G3. In order to widen the angle of the optical system L0, strong positive refractive power is required near the aperture stop SP, and inequality (6) defines a sharing ratio of the refractive power. In a case where the focal length of the second lens G2 increases or the focal length of the third lens G3 decreases and thereby the value becomes lower than the lower limit of inequality (6), the positive refractive power is biased towards the third lens G3, and spherical aberration and curvature of field largely occur in the underexposure direction. In a case where the focal length of the second lens f2 decreases or the focal length of the third lens G3 increases and thereby the value becomes higher than the upper limit of inequality (6), the positive refractive power is biased toward the second lens G2, and spherical aberration and curvature of field largely occur in the underexposure direction.

Inequality (7) defines the focal length of the fourth lens G4. More specifically, inequality (7) defines refractive power necessary for the fourth lens G4 to correct spherical aberration, curvature of field, and longitudinal chromatic aberration that occur in the underexposure direction in the second lens G2 and the third lens G3. In a case where the focal length of the fourth lens G4 decreases and the value becomes lower than the lower limit of inequality (7), the aberration correcting effect becomes insufficient. In a case where the focal length of the fourth lens G4 increases and the value becomes higher than the upper limit of inequality (7), the aberration correcting effect becomes excessive.

Inequality (8) defines the focal length of the fifth lens G5. More specifically, inequality (8) defines the refractive power necessary for the fifth lens G5 to refract an off-axis ray and reduce the incident angle of an off-axis ray on the image plane. In a case where the focal length of the fifth lens G5 increases and the value becomes lower than the lower limit of inequality (8), the effect of relaxing the incident angle is insufficient. In a case where the focal length of the fifth lens G5 decreases and the value becomes higher than the upper limit of inequality (8), the barrel-shaped distortion generated in the fifth lens G5 becomes too large.

Inequality (9) defines the shape of the second lens G2. Since the second lens G2 is located near the aperture stop SP, the off-axis and on-axis rays overlap each other on the lens surface and are refracted. In such a case, curvature of field and coma are likely to fluctuate due to surface shape manufacturing errors. Therefore, the second lens G2 may have a meniscus shape that is concave toward the object side, and inequality (9) defines the shape. In a case where the radius of curvature of the lens surface on the object side of the second lens G2 decreases and the value becomes lower than the lower limit of inequality (9), the incident angle of an off-axis ray incident on the second lens G2 becomes too large. In a case where the radius of curvature G2R2 of the lens surface on the image side of the second lens G2 becomes too large and thereby the value becomes higher than the upper limit of inequality (9), the refractive power of the second lens G2 becomes too large, and spherical aberration and curvature of field largely occur in the underexposure direction.

Inequality (10) defines the radius of curvature of the lens surface on the object side of the second lens G2. In a case where the radius of curvature of the lens surface on the object side of the second lens G2 decreases and the value becomes lower than the lower limit of inequality (10), the incident angle of an off-axis ray on the second lens G2 becomes too large, surface shape manufacturing errors occur, and curvature of field and coma tend to fluctuate. In a case where the radius of curvature of the lens surface on the object side of the second lens G2 increases and the value becomes higher than the upper limit of inequality (10), the positive refractive power of the second lens G2 becomes too small, and the refractive power necessary to widen the angle of the optical system L0 cannot be obtained.

Inequalities (11-1) and (11-2) define the focal length of the air lens including the lens surface on the image side of the first lens G1, the lens surface on the object side of the second lens G2, and the air gap between these two surfaces. The air lens having negative or weakly positive refractive power can secure the back focus necessary for the optical system L0. In a case where the negative focal length of the air lens increases and the value becomes lower than the lower limit of inequality (11-1), the negative refractive power of the air lens becomes too strong and the barrel-shaped distortion becomes too large. In a case where the positive focal length of the air lens decreases and the value becomes higher than the upper limit of inequality (11-2), it becomes difficult to secure the back focus necessary for the optical system L0.

Inequality (12) defines a relationship between the combined focal length of the second lens G2 and the third lens G3 and the focal length of the first lens G1. In a case where the combined focal length increases or the focal length of the first lens G1 decreases and thereby the value becomes lower than the lower limit of inequality (12), the positive combined refractive power becomes too small, and it becomes difficult to widen the angle of the optical system L0. Further, the thickness deviation ratio of the first lens G1 becomes large. In a case where the combined focal length decreases or the focal length of the first lens G1 increases and thereby the value becomes higher than the upper limit of inequality (12), the positive combined refractive power becomes too large, and spherical aberration and curvature of field largely occur in the underexposure direction. The negative refractive power of the first lens G1 becomes too small, and it becomes difficult to secure the back focus.

Inequalities (13) and (14) respectively define the refractive index and Abbe number of the first lens G1. Satisfying both inequalities (13) and (14) can correct lateral chromatic aberration while the first lens G1 is made of plastic resin. In a case where the values are out of ranges of inequalities (13) and (14), it becomes difficult to make the first lens G1 of plastic resin, and in a case where it is made of glass instead, the weight of the optical system L0 increases.

Inequalities (15) and (16) respectively define the refractive index and Abbe number of the lens GR placed closest to the image plane. Satisfying both inequalities (15) and (16) can reduce the curvature of the lens GR and suppress aberrations. The negative refractive power in the peripheral portion of the lens GR can correct lateral chromatic aberration. In a case where the values are out of ranges of inequalities (15) and (16), it becomes difficult to make the lens GR of plastic resin while an aberration correcting effect is obtained.

Inequality (17) defines a ratio of the distance h from the optical axis to the stationary point of the lens surface on the image side of the lens GR in the direction orthogonal to the optical axis, which has a shape that is concave toward the image side near the optical axis of the lens GR and convex toward the image side at the peripheral portion, to the distance TR on the optical axis from the aperture stop SP to that lens surface. Satisfying inequality (17) enables the on-axis curvature and peripheral curvature of the lens GR to be significantly changed, and can enhance the effect of correcting curvature of field and astigmatism in the lens GR. In addition, due to the lens surface on the image side of lens GR having a shape that is concave toward the image side near the optical axis and convex toward the image side at the peripheral portion, the Petzval sum can be paraxially corrected and astigmatism is corrected at the peripheral portion. In a case where the value becomes lower than the lower limit of inequality (17), the paraxial curvature decreases, the concave shape near the optical axis becomes shallow, and thereby the paraxial negative refractive power becomes small. As a result, it becomes difficult to correct the Petzval sum. In a case where the value becomes higher than the upper limit of inequality (17), the peripheral convex area decreases in the radial direction, and the effect of correcting astigmatism for off-axis rays and the effect of relaxing the incident angle of an off-axis ray on the image plane decrease.

Inequalities (2) to (17) may be replaced with inequalities (2a) to (17a) below:

$$0.06 < x1/T < 0.70 \quad (2a)$$

$$0.09 < T/TTL < 0.23 \quad (3a)$$

$$0.42 < Dsum/TTL < 0.80 \quad (4a)$$

-continued $$-3.40 < f1/f < -0.90 \quad (5a)$$

$$0.45 > f3/f2 < 1.35 \quad (6a)$$

$$-2.80 < f4/f < -0.90 \quad (7a)$$

$$0.01 < f/f5 < 1.30 \quad (8a)$$

$$-2.85 < (G2R2 + G2R1)/(G2R2 - G2R1) < -0.45 \quad (9a)$$

$$-9.00 < G2R1/f < -0.90 \quad (10a)$$

$$-1.40 < f/\text{fair} < 0.00 \quad (11a-1)$$

$$0.00 < f/\text{fair} < 0.25 \quad (11a-2)$$

$$-0.90 < f23/f1 < -0.13 \quad (12a)$$

$$1.5100 < n1 < 1.5900 \quad (13a)$$

$$47 < vd1 < 63 \quad (14a)$$

$$1.590 < nR < 1.730 \quad (15a)$$

$$16 < vdR < 29 \quad (16a)$$

$$0.27 < h/TR < 0.62 \quad (17a)$$

Inequalities (2) to (17) may be replaced with inequalities (2b) to (17b) below:

$$0.07 < x1/T < 0.60 \quad (2b)$$

$$0.10 < T/TTL < 0.21 \quad (3b)$$

$$0.44 < Dsum/TTL < 0.75 \quad (4b)$$

$$-3.30 < f1/f < -1.00 \quad (5b)$$

$$0.50 > f3/f2 < 1.20 \quad (6b)$$

$$-2.60 < f4/f < -1.00 \quad (7b)$$

$$0.03 < f/f5 < 1.00 \quad (8b)$$

$$-2.70 < (G2R2 + G2R1)/(G2R2 - G2R1) < -0.50 \quad (9b)$$

$$-8.00 < G2R1/f < -1.00 \quad (10b)$$

$$-1.30 < f/\text{fair} < 0.00 \quad (11b-1)$$

$$0.00 < f/\text{fair} < 0.20 \quad (11b-2)$$

$$-0.80 < f23/f1 < -0.15 \quad (12b)$$

$$1.5200 < n1 < 1.5750 \quad (13b)$$

$$49 < vd1 < 61 \quad (14b)$$

$$1.600 < nR < 1.720 \quad (15b)$$

$$17 < vdR < 28 \quad (16b)$$

$$0.30 < h/TR < 0.60 \quad (17b)$$

Inequalities (2) to (17) may be replaced with inequalities (2c) to (17c) below:

$$0.09 < x1/T < 0.55 \quad (2c)$$

$$0.12 < T/TTL < 0.18 \quad (3c)$$

$$0.50 < Dsum/TTL < 0.70 \quad (4c)$$

$$-3.20 < f1/f < -1.20 \quad (5c)$$

$$0.55 > f3/f2 < 1.10 \quad (6c)$$

-continued $$-2.40 < f4/f < -1.10 \quad (7c)$$

$$0.05 < f/f5 < 0.70 \quad (8c)$$

$$-2.60 < (G2R2 + G2R1)/(G2R2 - G2R1) < -0.55 \quad (9c)$$

$$-7.00 < G2R1/f < -1.20 \quad (10c)$$

$$-1.20 < f/\mathrm{fair} < 0.00 \quad (11c-1)$$

$$0.00 < f/\mathrm{fair} < 0.15 \quad (11c-2)$$

$$-0.60 < f23/f1 < -0.20 \quad (12c)$$

$$1.5250 < n1 < 1.5600 \quad (13c)$$

$$53 < vd1 < 59 \quad (14c)$$

$$1.610 < nR < 1.700 \quad (15c)$$

$$18 < vdR < 27 \quad (16c)$$

$$0.32 < h/TR < 0.55 \quad (17c)$$

A detailed description will now be given of the optical system L0 according to each example.

Each of the optical systems L0 according to Examples 1, 2, 4, 6, and 7 consists of a first lens G1 to a sixth lens G6 having negative, positive, positive, negative, positive, and negative refractive powers arranged in order from the object side to the image side. The optical system L0 according to Example 3 consists of a first lens G1 to a sixth lens G6 having negative, positive, positive, negative, positive, and positive refractive powers arranged in order from the object side to the image side. In the optical systems L0 according to Examples 1 to 4, 6, and 7, a lens GR disposed closest to the image plane corresponds to the sixth lens G6. In the optical systems L0 according to Examples 1 to 4, 6, and 7, a front group LF consists of the first lens G1, and a rear group LR consists of the second lens G2 to the sixth lens G6.

The optical system L0 according to Example 5 includes a first lens G1 to a seventh lens G7 having negative, positive, positive, negative, positive, positive, and negative refractive powers arranged in order from the object side to the image side. In the optical system L0 according to Example 5, a lens GR disposed closest to the image plane corresponds to the seventh lens G7. In the optical system L0 according to Example 5, a front group LF consists of the first lens G1, and a rear group LR consists of the second lens G2 to the seventh lens G7.

Each single lens included in the optical system L0 according to Examples 1 to 7 has aspheric surfaces on both sides. This configuration can satisfactorily correct aberrations such as spherical aberration and curvature of field in a case where the size of the optical system L0 is reduced.

Image stabilization can be provided by moving part or whole of the optical systems L0 in Examples 1 to 7 in a direction orthogonal to the optical axis.

Each single lens included in the optical system L0 according to Examples 1 to 7 is made of plastic resin. Thereby, the weight of the optical system L0 can be reduced. Moreover, plastic resin enables an aspherical surface with a large sag amount to be molded.

A description will now be given of numerical examples 1 to 7 corresponding to Examples 1 to 7.

In the surface data of each numerical example, r represents a radius of curvature of each optical surface, and d (mm) represents an on-axis distance (distance on the optical axis) between m-th and (m+1)-th surfaces, where m is the number of the surface counted from the light incident side. nd represents a refractive index of each optical member for the d-line, and νd represents an Abbe number of the optical member. The Abbe number of a certain material is represented as follows:

$$\nu d = (Nd - 1)/(NF - NC)$$

where Nd, NF, and NC are refractive indexes of the d-line (587.6 nm), F-line (486.1 nm), and C-line (656.3 nm) in the Fraunhofer line.

In each numerical example, d, a focal length (mm), an F-number, and a half angle of view (°) are all values in a case where the zoom lens is in an in-focus state on an infinity object. BF represents a back focus. The back focus is a distance on the optical axis from the final lens surface (the lens surface closest to the image plane) of the zoom lens to the paraxial image plane expressed in terms of air equivalent length. An overall lens length is a length obtained by adding the back focus to the distance on the optical axis from the foremost lens surface (lens surface closest to the object) to the final lens surface (that does not include the optical block FL).

An asterisk "*" attached to the right side of a surface number means that the optical surface is aspheric. The aspherical shape is expressed as follows:

$$x = (h^2/R)/\left[1 + \left\{1 - (1+k)(h/R)^2\right\}^{1/2}\right] + A4 \times h^4 + A6 \times h^6 + A8 \times h^8 + A10 \times h^{10} + A12 \times h^{12} + A14 \times h^{14} + A16 \times h^{16}$$

where x is a displacement amount from the surface vertex in the optical axis direction, h is a height from the optical axis in the direction perpendicular to the optical axis, R is a paraxial radius of curvature, k is a conical constant, and A4, A6, A8, A10, A12, A14, and A16 are aspherical coefficients of each order. "e±XX" in each aspherical coefficient means "$\times 10^{\pm XX}$." WIDE represents the wide-angle end, MIDDLE represents an intermediate (middle) zoom position, TELE represents a telephoto end.

Numerical Example 1

UNIT: mm
Surface Data

| Surface No. | r | d | nd | νd |
|---|---|---|---|---|
| 1* | 44.854 | 0.40 | 1.53504 | 55.7 |
| 2* | 2.438 | 0.64 | | |
| 3(Diaphragm) | ∞ | 0.11 | | |
| 4* | −5.918 | 0.62 | 1.53504 | 55.7 |
| 5* | −1.544 | 0.12 | | |

-continued

| UNIT: mm<br>Surface Data | | | | |
|---|---|---|---|---|
| 6* | 6.355 | 1.05 | 1.53504 | 55.7 |
| 7* | −2.291 | 0.11 | | |
| 8* | −1.528 | 0.34 | 1.67070 | 19.3 |
| 9* | −5.647 | 0.26 | | |
| 10* | 2.622 | 0.52 | 1.53504 | 55.7 |
| 11* | −15.980 | 0.10 | | |
| 12* | 1.290 | 0.50 | 1.67070 | 19.3 |
| 13* | 1.007 | 0.62 | | |
| 14 | ∞ | 0.50 | 1.51633 | 64.1 |
| 15 | ∞ | 0.40 | | |
| Image Plane | ∞ | | | |

Aspheric Data

1st Surface

K = −5.10974e+00 A 4 = 2.58374e−01 A 6 = −2.32403e−01 A 8 = 2.59763e−01
A10 = −2.15870e−01 A12 = 1.20915e−01 A14 = −3.82090e−02 A16 = 4.86914e−03

2nd Surface

K = 4.54238e+00 A 4 = 3.73616e−01 A 6 = 2.82707e−01 A 8 = 7.57143e−01
A10 = −1.49881e+00 A12 = 2.05411e+00 A14 = −8.61383e−01 A16 = −2.85612e−01

4th Surface

K = 0.00000e+00 A 4 = −1.12583e−01 A 6 = −2.23016e−01 A 8 = 5.21309e−01
A10 = −1.41813e+00

5th Surface

K = 0.00000e+00 A 4 = −1.06122e−01 A 6 = 3.64098e−02 A 8 = −3.61070e−01
A10 = 6.65467e−01 A12 = −6.66978e−01

6th Surface

K = 0.00000e+00 A 4 = −2.08793e−02 A 6 = 4.48319e−03 A 8 = 1.49744e−02
A10 = −1.64420e−02 A12 = 2.27920e−04

7th Surface

K = 0.00000e+00 A 4 = −1.16027e−01 A 6 = 8.40470e−02 A 8 = −2.23349e−02
A10 = −1.86714e−03

8th Surface

K = 0.00000e+00 A 4 = −9.53043e−04 A 6 = 2.46981e−01 A 8 = −1.81603e−01
A10 = 4.88421e−02 A12 = −1.55463e−03

9th Surface

K = 0.00000e+00 A 4 = −1.01472e−01 A 6 = 2.32428e−01 A 8 = −1.39297e−01
A10 = 3.71883e−02 A12 = −3.75772e−03

10th Surface

K = 0.00000e+00 A 4 = −2.08842e−02 A 6 = 9.53825e−03 A 8 = −8.81207e−03
A10 = 1.07801e−03

11th Surface

K = 0.00000e+00 A 4 = 1.49550e−01 A 6 = −5.86093e−02 A 8 = 8.61236e−03
A10 = −4.80035e−04

12th Surface

K = −8.00242e−01 A 4 = −1.85283e−01 A 6 = 3.30634e−02 A 8 = −2.87588e−03
A10 = 5.57656e−05

13th Surface

K = −2.22227e+00 A 4 = −1.21405e−01 A 6 = 4.22141e−02 A 8 = −9.76127e−03
A10 = 1.40866e−03 A12 = −1.10634e−04 A14 = 3.51288e−06

| | |
|---|---|
| Focal Length: | 2.30 |
| Fno: | 2.50 |
| Half Angle of View (°): | 55.12 |
| Image Height: | 3.30 |
| Overall lens length: | 6.13 |
| BF | 1.35 |

Single Lens Data

| Lens | Starting Surface | Focal Length |
|---|---|---|
| 1 | 1 | −4.83 |
| 2 | 4 | 3.72 |

-continued

| UNIT: mm<br>Surface Data | | |
|---|---|---|
| 3 | 6 | 3.29 |
| 4 | 8 | −3.23 |
| 5 | 10 | 4.25 |
| 6 | 12 | −23.53 |

Numerical Example 2

UNIT: mm
Surface Data

| Surface No. | r | d | nd | νd |
|---|---|---|---|---|
| 1* | −4.868 | 0.50 | 1.53504 | 55.7 |
| 2* | 5.832 | 0.57 | | |
| 3(Diaphragm) | ∞ | 0.09 | | |
| 4* | −10.877 | 1.08 | 1.53504 | 55.7 |
| 5* | −2.008 | 0.11 | | |
| 6* | 4.905 | 1.13 | 1.53504 | 55.7 |
| 7* | −2.856 | 0.08 | | |
| 8* | −2.542 | 0.40 | 1.67070 | 19.3 |
| 9* | −7.209 | 0.24 | | |
| 10* | 2.889 | 0.62 | 1.53504 | 55.7 |
| 11* | 4.511 | 0.67 | | |
| 12* | 2.632 | 0.60 | 1.67070 | 19.3 |
| 13* | 1.615 | 0.50 | | |
| 14 | ∞ | 0.50 | 1.51633 | 64.1 |
| 15 | ∞ | 0.40 | | |
| Image Plane | ∞ | | | |

Aspheric Data

1st Surface

K = 1.55071e−01 A 4 = 1.15187e−01 A 6 = −5.4914le−02 A 8 = 2.36799e−02
A10 = −7.44272e−03 A12 = 1.54259e−03 A14 = −1.85168e−04 A16 = 9.59947e−06

2nd Surface

K = 7.37724e+00 A 4 = 1.65535e−01 A 6 = 6.79976e−02 A 8 = −3.87778e−01
A10 = 9.33812e−01 A12 = −1.16883e+00 A14 = 7.82685e−01 A16 = −2.13246e−01
A18 = −6.13183e−05

4th Surface

K = 0.00000e+00 A 4 = −4.48745e−02 A 6 = −5.31522e−02 A 8 = 5.53273e−02
A10 = −8.80872e−02

5th Surface

K = 0.00000e+00 A 4 = −5.56343e−02 A 6 = 2.19971e−03 A 8 = −1.29578e−02
A10 = 9.56925e−03 A12 = −7.92801e−03

6th Surface

K = 0.00000e+00 A 4 = −1.56737e−02 A 6 = 7.04130e−03 A 8 = −7.61633e−03
A10 = 2.61939e−03 A12 = −1.15650e−03

7th Surface

K = 0.00000e+00 A 4 = −3.30001e−02 A 6 = 8.51259e−03 A 8 = −4.03181e−04
A10 = −1.37088e−03

8th Surface

K = 0.00000e+00 A 4 = −1.14635e−02 A 6 = 4.18063e−02 A 8 = −1.66850e−02
A10 = 2.34474e−03 A12 = 1.08198e−04

9th Surface

K = 0.00000e+00 A 4 = −4.95884e−03 A 6= 3.09452e−02 A 8 = −1.29088e−02
A10 = 2.99390e−03 A12 = −2.97265e−04

10th Surface

K = 0.00000e+00 A 4 = −1.15464e−02 A 6 =− 1.21732e−02 A 8 = 2.84234e−03
A10 = −5.64496e−04 A12 = 4.17671e−05

11th Surface

K = 0.00000e+00 A 4 = 2.86345e−02 A 6 = −2.31415e−02 A 8 = 5.25689e−03
A10 = −7.44364e−04 A12 = 4.32956e−05

-continued

| UNIT: mm Surface Data |
|---|
| 12th Surface |
| K = 3.27936e−02 A 4 = −1.05352e−01 A 6 = 1.37559e−02 A 8 = 1.46391e−03 A10 = −1.39417e−03 A12 = 2.42353e−04 A14 = −1.40640e−05 |
| 13th Surface |
| K = −3.13639e+00 A 4 = −6.85409e−02 A 6 = 1.97372e−02 A 8 = −3.80389e−03 A10 = 4.25439e−04 A12 = −2.48455e−05 A14 = 5.76159e−07 |

| | |
|---|---|
| Focal Length: | 2.96 |
| Fno: | 2.57 |
| Half Angle of View (°): | 52.64 |
| Image Height: | 3.88 |
| Overall lens length: | 7.33 |
| BF | 1.23 |

Single Lens Data

| Lens | Starting Surface | Focal Length |
|---|---|---|
| 1 | 1 | −4.88 |
| 2 | 4 | 4.41 |
| 3 | 6 | 3.55 |
| 4 | 8 | −6.06 |
| 5 | 10 | 13.24 |
| 6 | 12 | −8.16 |

Numerical Example 3

UNIT: mm
Surface Data

| Surface No. | r | d | nd | νd |
|---|---|---|---|---|
| 1* | −2.428 | 0.50 | 1.53504 | 55.7 |
| 2* | −6.165 | 0.63 | | |
| 3(Diaphragm) | ∞ | 0.15 | | |
| 4* | −7.628 | 1.07 | 1.53504 | 55.7 |
| 5* | −1.815 | −0.08 | | |
| 6 | ∞ | 0.18 | | |
| 7* | 7.545 | 1.25 | 1.53504 | 55.7 |
| 8* | −2.571 | 0.27 | | |
| 9* | −1.727 | 0.40 | 1.67070 | 19.3 |
| 10* | −5.353 | 0.17 | | |
| 11* | 2.612 | 0.65 | 1.53496 | 55.8 |
| 12* | 2.704 | 0.28 | | |
| 13* | 1.750 | 0.60 | 1.62520 | 25.4 |
| 14* | 1.626 | 0.52 | | |
| 15 | ∞ | 0.50 | 1.51633 | 64.1 |
| 16 | ∞ | 0.40 | | |
| Image Plane | ∞ | | | |

| Aspheric Data |
|---|
| 1st Surface |
| K = −1.00000e+01 A 4 = 6.03286e−02 A 6 = −1.75332e−02 A 8 = 3.69655e−03 A10 = −4.24181e−04 A12 = 2.00824e−05 |
| 2nd Surface |
| K = 0.00000e+00 A 4 = 1.54097e−01 A 6 = −3.00773e−02 A 8 = −3.29964e−03 A10 = 9.99220e−03 A12 = −1.95079e−03 |
| 4th Surface |
| K = 0.00000e+00 A 4 = −5.73510e−02 A 6 = −1.43112e−02 A 8 = −3.70522e−02 |
| 5th Surface |
| K = 0.00000e+00 A 4 = −6.58922e−03 A 6 = −2.69578e−02 A 8 = 1.03067e−02 |
| 7th Surface |
| K = 0.00000e+00 A 4 = 1.85376e−02 A 6 = −2.89351e−02 A 8 = 1.98658e−02 A10 = −3.56162e−03 |

-continued

| UNIT: mm<br>Surface Data |
|---|
| 8th Surface |
| K = 0.00000e+00 A 4 = −5.62447e−02 A 6 = 3.67543e−02 A 8 = −1.44583e−02<br>A10 = 3.60593e−03 |
| 9th Surface |
| K = 0.00000e+00 A 4 = −4.12051e−02 A 6 = 1.08458e−01 A 8 = −3.95017e−02<br>A10 = 5.66188e−03 |
| 10th Surface |
| K = 0.00000e+00 A 4 = −6.15660e−02 A 6 = 6.82598e−02 A 8 = −1.82649e−02<br>A10 = 1.61523e−03 |
| 11th Surface |
| K = 0.00000e+00 A 4 = −6.15071e−02 A 6 = 5.55664e−03 A 8 = −7.48021e−04 |
| 12th Surface |
| K = 0.00000e+00 A 4 = −4.30437e−02 A 6 = −1.47047e−03 A 8 = −1.26674e−08 |
| 13th Surface |
| K = −2.66556e+00 A 4 = −8.92747e−02 A 6 = 9.67091e−03 A 8 = −1.97026e−04<br>A10 = 4.59495e−06 A12 = −1.29352e−06 |
| 14th Surface |
| K = −1.21200e+00 A 4 = −9.83604e−02 A 6 = 1.78466e−02 A 8 = −1.72373e−03<br>A10 = 8.43631e−05 A12 = −1.71442e−06 |

| | |
|---|---|
| Focal Length: | 2.94 |
| Fno: | 2.57 |
| Half Angle of View (°): | 52.81 |
| Image Height: | 3.88 |
| Overall lens length: | 7.33 |
| BF | 1.25 |

Single Lens Data

| Lens | Starting Surface | Focal Length |
|---|---|---|
| 1 | 1 | −7.85 |
| 2 | 4 | 4.18 |
| 3 | 7 | 3.75 |
| 4 | 9 | −3.98 |
| 5 | 11 | 41.32 |
| 6 | 13 | 42.52 |

Numerical Example 4

UNIT: mm
Surface Data

| Surface No. | r | d | nd | νd |
|---|---|---|---|---|
| 1* | −3.658 | 0.50 | 1.53504 | 55.7 |
| 2* | −30.836 | 0.70 | | |
| 3(Diaphragm) | ∞ | 0.13 | | |
| 4* | −9.207 | 0.69 | 1.53504 | 55.7 |
| 5* | −1.993 | 0.36 | | |
| 6* | 7.400 | 1.25 | 1.53504 | 55.7 |
| 7* | −2.336 | 0.29 | | |
| 8* | −0.914 | 0.40 | 1.67070 | 19.3 |
| 9* | −1.482 | 0.10 | | |
| 10* | 5.701 | 0.78 | 1.53504 | 55.7 |
| 11* | −5.993 | 0.08 | | |
| 12* | 2.111 | 0.60 | 1.67070 | 19.3 |
| 13* | 1.244 | 0.72 | | |
| 14 | ∞ | 0.50 | 1.51633 | 64.1 |
| 15 | ∞ | 0.40 | | |
| Image Plane | ∞ | | | |

-continued

| UNIT: mm<br>Surface Data |
| --- |
| Aspheric Data |
| 1st Surface |
| K = −1.00000e+01 A 4 = 5.61175e−02 A 6 = −1.50380e−02 A 8 = 2.88552e−03<br>A10 = −3.03416e−04 A12 = 1.31367e−05 |
| 2nd Surface |
| K = 7.71923e+00 A 4 = 1.05704e−01 A 6 = −3.69317e−03 A 8 = 6.49340e−04<br>A10 = −2.28333e−03 A12 = 3.05181e−03 |
| 4th Surface |
| K = 0.00000e+00 A 4 = −7.33122e−02 A 6 = −3.56565e−02 A 8 = −1.21429e−02<br>A10 = −5.18042e−02 |
| 5th Surface |
| K = 0.00000e+00 A 4 = −6.55551e−02 A 6 = −2.51965e−02 A 8 = 1.67314e−02<br>A10 = −2.80733e−02 |
| 6th Surface |
| K = 0.00000e+00 A 4 = −2.13289e−02 A 6 = 6.16056e−03 A 8 = −1.71390e−03<br>A10 = −9.21731e−04 |
| 7th Surface |
| K = 0.00000e+00 A 4 = −2.23579e−02 A 6 = −4.14788e−03 A 8 = 5.77057e−03<br>A10 = −1.59222e−03 |
| 8th Surface |
| K = −1.82227e+00 A 4 = −2.59014e−02 A 6 = 3.24122e−02 A 8 = −7.67586e−03<br>A10 = 8.03138e−04 |
| 9th Surface |
| K = −5.48902e−01 A 4 = 7.92887e−02 A 6 = −7.05805e−03 A 8 = 3.42842e−03<br>A10 = −2.61252e−04 |
| 10th Surface |
| K = 3.72147e+00 A 4 = 2.82999e−02 A 6 = −1.44233e−02 A 8 = 1.08416e−03<br>A10 = −7.23917e−06 |
| 11th Surface |
| K = −7.25742e+00 A 4 = 1.19414e−01 A 6 = −4.25677e−02 A 8 = 6.86460e−03<br>A10 = −6.17852e−04 A12 = 2.34147e−05 |
| 12th Surface |
| K = −8.37208e−01 A 4 = −6.68710e−02 A 6 = 2.03052e−03 A 8 = 8.55185e−04<br>A10 = −1.24435e−04 A12 = 4.78200e−06 |
| 13th Surface |
| K = −3.30201e+00 A 4 = −3.43016e−02 A 6 −4.28150e−03 A 8 = −2.61852e−04<br>A10 = 7.98050e−06 A12 = −1.68955e−07 |

| | |
| --- | --- |
| Focal Length: | 2.95 |
| Fno: | 2.57 |
| Half Angle of View (°): | 52.75 |
| Image Height: | 3.88 |
| Overall lens length: | 7.33 |
| BF | 1.45 |

Single Lens Data

| Lens | Starting Surface | Focal Length |
| --- | --- | --- |
| 1 | 1 | −7.81 |
| 2 | 4 | 4.60 |
| 3 | 6 | 3.47 |
| 4 | 8 | −4.96 |
| 5 | 10 | 5.59 |
| 6 | 12 | −6.25 |

Numerical Example 5

UNIT: mm
Surface Data

| Surface No. | r | d | nd | νd |
|---|---|---|---|---|
| 1* | 6.458 | 0.40 | 1.53504 | 55.7 |
| 2* | 2.118 | 0.58 | | |
| 3(Diaphragm) | ∞ | 0.15 | | |
| 4* | −3.465 | 0.49 | 1.53504 | 55.7 |
| 5* | −1.376 | 0.05 | | |
| 6* | 8.119 | 0.89 | 1.53504 | 55.7 |
| 7* | −2.162 | 0.08 | | |
| 8* | −1.407 | 0.34 | 1.67070 | 19.3 |
| 9* | −2.759 | 0.10 | | |
| 10* | 19.587 | 0.78 | 1.53504 | 55.7 |
| 11* | −7.259 | 0.10 | | |
| 12* | −10.932 | 0.40 | 1.53504 | 55.7 |
| 13* | −2.257 | 0.10 | | |
| 14* | 1.510 | 0.50 | 1.67070 | 19.3 |
| 15* | 0.936 | 0.63 | | |
| 16 | ∞ | 0.50 | 1.51633 | 64.1 |
| 17 | ∞ | 0.13 | | |
| Image Plane | ∞ | | | |

Aspheric Data

1st Surface

K = −1.00000e+01 A 4 = 2.47895e−01 A 6 = −2.07611e−01 A 8 = 1.92539e−01
A10 = −1.07413e−01 A12 = 2.80386e−02 A14 = 3.03216e−03 A16 = −2.57441e−03

2nd Surface

K = 3.77580e+00 A 4 = 3.44844e−01 A 6 = −4.37041e−03 A 8 = −1.26955e+00
A10 = 6.22456e+00 A12 = −1.38639e+01 A14 = 1.65132e+01 A16 = −8.02800e+00

4th Surface

K = 0.00000e+00 A 4 = −1.23183e−01 A 6 = −3.84616e−01 A 8 = 1.29881e+00
A10 = −2.78564e+00

5th Surface

K = 0.00000e+00 A 4 = −1.05101e−01 A 6 = 1.27912e−01 A 8 = −8.19392e−01
A10 = 1.79775e+00 A12 = −1.83464e+00

6th Surface

K = 0.00000e+00 A 4 = −4.58550e−02 A 6 = 3.17041e−02 A 8 = 9.22088e−03
A10 = −3.28449e−02 A12 = −3.76701e−03

7th Surface

K = 0.00000e+00 A 4 = −1.35054e−01 A 6 = 1.59987e−01 A 8 = −9.10422e−02
A10 = 1.05087e−02

8th Surface

K = 0.00000e+00 A 4 = 1.63585e−01 A 6 = 9.60355e−02 A 8 = −8.29861e−02
A10 = 2.45568e−04 A12 = 1.31236e−02

9th Surface

K = 0.00000e+00 A 4 = 1.00876e−01 A 6 = 3.60420e−02 A 8 = −3.91878e−02
A10 = 9.91130e−03 A12 = −5.81637e−04

10th Surface

K = 0.00000e+00 A 4 = −9.01749e−02 A 6 = 6.85541e−02 A 8 = −1.39937e−02
A10 = 4.66725e−04

11th Surface

K = 0.00000e+00 A 4 = −1.92859e−01 A 6 = 1.08180e−01 A 8 = −1.78849e−02
A10 = 1.04349e−03

12th Surface

K = 0.00000e+00 A 4 = −5.90942e−02 A 6 = 3.09392e−02 A 8 = −8.94600e−03
A10 = 1.30745e−03

13th Surface

K = 0.00000e+00 A 4 = 1.61211e−01 A 6 = −5.92086e−02 A 8 = 1.20593e−02
A10 = −9.47694e−04

14th Surface

K = −5.12936e−01 A 4 = −2.13959e−01 A 6 = 5.36712e−02 A 8 = −1.02618e−02
A10 = 3.48894e−04

-continued

| UNIT: mm Surface Data |
|---|
| 15th Surface |
| K = −2.98502e+00 A 4 = −9.15929e−02 A 6 = 3.21065e−02 A 8 = −7.48850e−03 A10 = 1.05863e−03 A12 = −8.69042e−05 A14 = 3.07161e−06 |

| | |
|---|---|
| Focal Length: | 2.24 |
| Fno: | 2.50 |
| Half Angle of View (°): | 55.78 |
| Image Height: | 3.30 |
| Overall lens length: | 6.06 |
| BF | 1.09 |

Single Lens Data

| Lens | Starting Surface | Focal Length |
|---|---|---|
| 1 | 1 | −6.08 |
| 2 | 4 | 3.94 |
| 3 | 6 | 3.29 |
| 4 | 8 | −4.76 |
| 5 | 10 | 10.00 |
| 6 | 12 | 5.23 |
| 7 | 14 | −5.64 |

Numerical Example 6

UNIT: mm
Surface Data

| Surface No. | r | d | nd | νd |
|---|---|---|---|---|
| 1* | −2.624 | 0.40 | 1.53504 | 55.7 |
| 2* | −6.036 | 0.72 | | |
| 3(Diaphragm) | ∞ | 0.13 | | |
| 4* | −8.191 | 0.66 | 1.53504 | 55.7 |
| 5* | −2.039 | 0.32 | | |
| 6* | 7.725 | 1.21 | 1.53504 | 55.7 |
| 7* | −2.594 | 0.28 | | |
| 8* | −0.843 | 0.35 | 1.67070 | 19.3 |
| 9* | −1.269 | 0.10 | | |
| 10* | 3.121 | 0.85 | 1.54390 | 56.0 |
| 11* | 64.912 | 0.23 | | |
| 12* | 2.437 | 0.55 | 1.67070 | 19.3 |
| 13* | 1.439 | 0.60 | | |
| 14 | ∞ | 0.50 | 1.51633 | 64.1 |
| 15 | ∞ | 0.40 | | |
| Image Plane | ∞ | | | |

Aspheric Data

| 1st Surface |
|---|
| K = −1.00000e+01 A 4 = 6.03554e−02 A 6 = −1.59995e−02 A 8 = 2.99761e−03 A10 = −2.94646e−04 A12 = 1.17489e−05 |
| 2nd Surface |
| K = −9.96687e+00 A 4 = 1.33583e−01 A 6 = −3.64447e−02 A 8 = 2.32001e−02 A10 = −1.21158e−02 A12 = 3.96097e−03 |
| 4th Surface |
| K = 0.00000e+00 A 4 = −7.63143e−02 A 6 = −3.08724e−02 A 8 = −2.90072e−02 A10 = −2.44607e−02 |
| 5th Surface |
| K = 0.00000e+00 A 4 = −7.28440e−02 A 6 = −1.77884e−02 A 8 = 1.38527e−02 A10 = −2.51818e−02 |
| 6th Surface |
| K = 0.00000e+00 A 4 = −3.11454e−02 A 6 = 1.41508e−02 A 8 = −6.95509e−03 A10 = −3.06658e−05 |

-continued

| UNIT: mm Surface Data |
|---|
| 7th Surface |
| K = 0.00000e+00 A 4 = −4.49178e−02 A 6 = 1.48582e−02 A 8 = −5.71955e−03 A10 = 2.46606e−04 |
| 8th Surface |
| K = −1.87509e+00 A 4 = 5.63301e−03 A 6 = 2.49331e−02 A 8 = −8.76314e−03 A10 = 1.18459e−03 |
| 9th Surface |
| K = −1.54008e+00 A 4 =7.36240e−02 A 6 = −2.05254e−02 A 8 = 8.26123e−03 A10 = −1.14720e−03 |
| 10th Surface |
| K = −8.66931e+00 A 4 = 1.10526e−02 A 6 = −6.33933e−03 A 8 = −1.89969e−04 A10 = 8.46076e−05 |
| 11th Surface |
| K = 6.26560e+02 A 4 = 5.48271e−02 A 6 = −2.10990e−02 A 8 = 2.72630e−03 A10 = −1.55540e−04 |
| 12th Surface |
| K = −3.76670e−01 A 4 = −8.12549e−02 A 6 = 3.99403e−03 A 8 = 9.77794e−04 A10 = −1.72885e−04 A12 = 6.42501e−06 |
| 13th Surface |
| K = −3.16175e+00 A 4 = −4.63295e−02 A 6 = 7.65771e−03 A 8 = −6.88444e−04 A10 = 3.39710e−05 A12 = −7.98143e−07 |

| | |
|---|---|
| Focal Length: | 2.95 |
| Fno: | 2.57 |
| Half Angle of View (°): | 52.76 |
| Image Height: | 3.88 |
| Overall lens length: | 7.13 |
| BF | 1.33 |

Single Lens Data

| Lens | Starting Surface | Focal Length |
|---|---|---|
| 1 | 1 | −9.05 |
| 2 | 4 | 4.89 |
| 3 | 6 | 3.78 |
| 4 | 8 | −5.58 |
| 5 | 10 | 6.00 |
| 6 | 12 | −6.73 |

Numerical Example 7

UNIT: mm
Surface Data

| Surface No. | r | d | nd | νd |
|---|---|---|---|---|
| 1* | 21.538 | 0.40 | 1.54390 | 56.0 |
| 2* | 2.004 | 0.75 | | |
| 3(Diaphragm) | ∞ | 0.09 | | |
| 4* | −18.220 | 0.85 | 1.54390 | 56.0 |
| 5* | −2.042 | 0.07 | | |
| 6* | 5.785 | 1.22 | 1.54390 | 56.0 |
| 7* | −2.686 | 0.05 | | |
| 8* | −7.121 | 0.30 | 1.67070 | 19.3 |
| 9* | 8.800 | 0.33 | | |
| 10* | 2.576 | 0.55 | 1.54390 | 56.0 |
| 11* | 3.399 | 0.65 | | |
| 12* | 2.148 | 0.60 | 1.63910 | 23.5 |
| 13* | 1.542 | 0.58 | | |
| 14 | ∞ | 0.50 | 1.51633 | 64.1 |
| 15 | ∞ | 0.40 | | |
| Image Plane | ∞ | | | |

-continued

| UNIT: mm<br>Surface Data |
|---|
| Aspheric Data |
| 1st Surface |
| K = −6.28931e+00 A 4 = 4.16536e−02 A 6 = −1.27342e−02 A 8 = 2.04754e−03<br>A10 = −1.38619e−04 |
| 2nd Surface |
| K = −7.13889e+00 A 4 = 1.99690e−01 A 6 = −1.08505e−02 A 8 = −2.14950e−04<br>A10 = 2.35800e−02 |
| 4th Surface |
| K = 0.00000e+00 A 4 = −6.01295e−02 A 6 = −5.30816e−02 A 8 = 4.26704e−02<br>A10 = −7.62943e−02 |
| 5th Surface |
| K = 0.00000e+00 A 4 = −5.08759e−02 A 6 = −2.02665e−02 A 8 = 6.23772e−03<br>A10 = −1.15120e−02 |
| 6th Surface |
| K = 0.00000e+00 A 4 = −6.43750e−03 A 6 = −4.76298e−03 A 8 = 2.66962e−04 |
| 7th Surface |
| K = 0.00000e+00 A 4 = −6.02636e−02 A 6 = 2.87875e−02 A 8 = −6.34031e−03 |
| 8th Surface |
| K = 0.00000e+00 A 4 = −5.17712e−02 A 6 = 3.57924e−02 A 8 = −7.01990e−03 |
| 9th Surface |
| K = 0.00000e+00 A 4 = −9.45214e−03 A 6 = 1.96647e−02 A 8 = −3.46866e−03 |
| 10th Surface |
| K = 0.00000e+00 A 4 = −2.47074e−02 A 6 = −2.47926e−03 A 8 = 2.66088e−04<br>A10 = −3.24499e−05 |
| 11th Surface |
| K = 0.00000e+00 A 4 = 2.58321e−03 A 6 = −7.89756e−03 A 8 = 1.20035e−03<br>A10 = −9.34877e−05 |
| 12th Surface |
| K = −3.63370e−01 A 4 = −1.02392e−01 A 6 = 1.79814e−02 A 8 = −2.19312e−03<br>A10 = 4.62600e−05 A12 = −2.34196e−07 |
| 13th Surface |
| K = −3.17912e+00 A 4 = −5.13866e−02 A 6 = 1.16378e−02 A 8 = −1.61568e−03<br>A10 = 1.09141e−04 A12 = −2.91799e−06 |

| | |
|---|---|
| Focal Length: | 2.96 |
| Fno: | 2.57 |
| Half Angle of View (°): | 52.60 |
| Image Height: | 3.88 |
| Overall lens length: | 7.18 |
| BF | 1.31 |

Single Lens Data

| Lens | Starting Surface | Focal Length |
|---|---|---|
| 1 | 1 | −4.09 |
| 2 | 4 | 4.15 |
| 3 | 6 | 3.55 |
| 4 | 8 | −5.82 |
| 5 | 10 | 15.81 |
| 6 | 12 | −13.93 |

TABLES 1 and 2 summarize various values in each numerical example.

TABLE 1

| | Ex 1 | Ex 2 | Ex 3 | Ex 4 | Ex 5 | Ex 6 | Ex 7 |
|---|---|---|---|---|---|---|---|
| f | 2.300 | 2.958 | 2.940 | 2.946 | 2.245 | 2.945 | 2.963 |
| f1 | −4.834 | −4.879 | −7.853 | −7.807 | −6.085 | −9.046 | −4.091 |

TABLE 1-continued

| | Ex 1 | Ex 2 | Ex 3 | Ex 4 | Ex 5 | Ex 6 | Ex 7 |
|---|---|---|---|---|---|---|---|
| f2 | 3.720 | 4.414 | 4.181 | 4.600 | 3.939 | 4.891 | 4.151 |
| f3 | 3.287 | 3.554 | 3.745 | 3.475 | 3.290 | 3.784 | 3.553 |
| f4 | −3.230 | −6.062 | −3.979 | −4.956 | −4.764 | −5.584 | −5.824 |
| f5 | 4.251 | 13.244 | 41.318 | 5.591 | 10.000 | 6.000 | 15.814 |
| f23 | 1.882 | 2.087 | 2.116 | 2.225 | 1.878 | 2.349 | 2.067 |
| fair | −3.078 | −6.947 | 46.734 | −25.046 | −2.297 | 35.394 | −3.245 |
| T | 1.045 | 1.074 | 1.130 | 1.196 | 0.977 | 1.120 | 1.154 |
| TR | 3.731 | 5.029 | 4.949 | 4.688 | 3.989 | 4.678 | 4.717 |
| h | 1.856 | 1.862 | 1.890 | 2.365 | 1.833 | 2.185 | 2.046 |
| TTL | 6.300 | 7.500 | 7.500 | 7.500 | 6.226 | 7.300 | 7.350 |
| Dsum | 3.430 | 4.331 | 4.475 | 4.218 | 3.808 | 4.020 | 3.928 |
| G2R1 | −5.918 | −10.877 | −7.628 | −9.207 | −3.465 | −8.191 | −18.220 |
| G2R2 | −1.544 | −2.008 | −1.815 | −1.993 | −1.376 | −2.039 | −2.042 |
| x1 | 0.521 | 0.277 | 0.430 | 0.354 | 0.391 | 0.398 | 0.124 |
| curvature radius of Sref | 7.299 | −6.776 | −3.003 | −4.522 | 6.458 | −3.213 | 14.006 |
| n1 | 1.5350 | 1.5350 | 1.5350 | 1.5350 | 1.5350 | 1.5350 | 1.5439 |
| nR | 1.6707 | 1.6707 | 1.6252 | 1.6707 | 1.6707 | 1.6707 | 1.6391 |
| vd1 | 55.730 | 55.730 | 55.730 | 55.730 | 55.730 | 55.730 | 56.000 |
| vdR | 19.300 | 19.300 | 25.400 | 19.300 | 19.300 | 19.300 | 23.500 |

TABLE 2

| | | | Ex 1 | Ex 2 | Ex 3 | Ex 4 | Ex 5 | Ex 6 | Ex 7 |
|---|---|---|---|---|---|---|---|---|---|
| Inequality | (1) | f2/f1 | −0.770 | −0.905 | −0.532 | −0.589 | −0.647 | −0.541 | −1.015 |
| | (2) | x1/T | 0.499 | 0.258 | 0.380 | 0.296 | 0.400 | 0.356 | 0.108 |
| | (3) | T/TTL | 0.166 | 0.143 | 0.151 | 0.159 | 0.157 | 0.153 | 0.157 |
| | (4) | Dsum/TTL | 0.544 | 0.577 | 0.597 | 0.562 | 0.612 | 0.551 | 0.534 |
| | (5) | f1/f | −2.102 | −1.650 | −2.671 | −2.650 | −2.711 | −3.072 | −1.381 |
| | (6) | f3/f2 | 0.884 | 0.805 | 0.896 | 0.755 | 0.835 | 0.774 | 0.856 |
| | (7) | f4/f | −1.404 | −2.049 | −1.353 | −1.682 | −2.123 | −1.896 | −1.966 |
| | (8) | f/f5 | 0.541 | 0.223 | 0.071 | 0.527 | 0.224 | 0.491 | 0.187 |
| | (9) | (G2R2 + G2R1)/(G2R2 − G2R1) | −1.706 | −1.453 | −1.624 | −1.552 | −2.317 | −1.663 | −1.252 |
| | (10) | G2R1/f | −2.573 | −3.677 | −2.595 | −3.125 | −1.544 | −2.781 | −6.150 |
| | (11) | f/fair | −0.747 | −0.426 | 0.063 | −0.118 | −0.977 | 0.083 | −0.913 |
| | (12) | f23/f1 | −0.389 | −0.428 | −0.269 | −0.285 | −0.309 | −0.260 | −0.505 |
| | (13) | n1 | 1.5350 | 1.5350 | 1.5350 | 1.5350 | 1.5350 | 1.5350 | 1.5439 |
| | (14) | vd1 | 55.730 | 55.730 | 55.730 | 55.730 | 55.730 | 55.730 | 56.000 |
| | (15) | nR | 1.6707 | 1.6707 | 1.6252 | 1.6707 | 1.6707 | 1.6707 | 1.6391 |
| | (16) | vdR | 19.300 | 19.300 | 25.400 | 19.300 | 19.300 | 19.300 | 23.500 |
| | (17) | h/TR | 0.497 | 0.370 | 0.382 | 0.504 | 0.460 | 0.467 | 0.434 |

Image Pickup Apparatus

Figure 16:
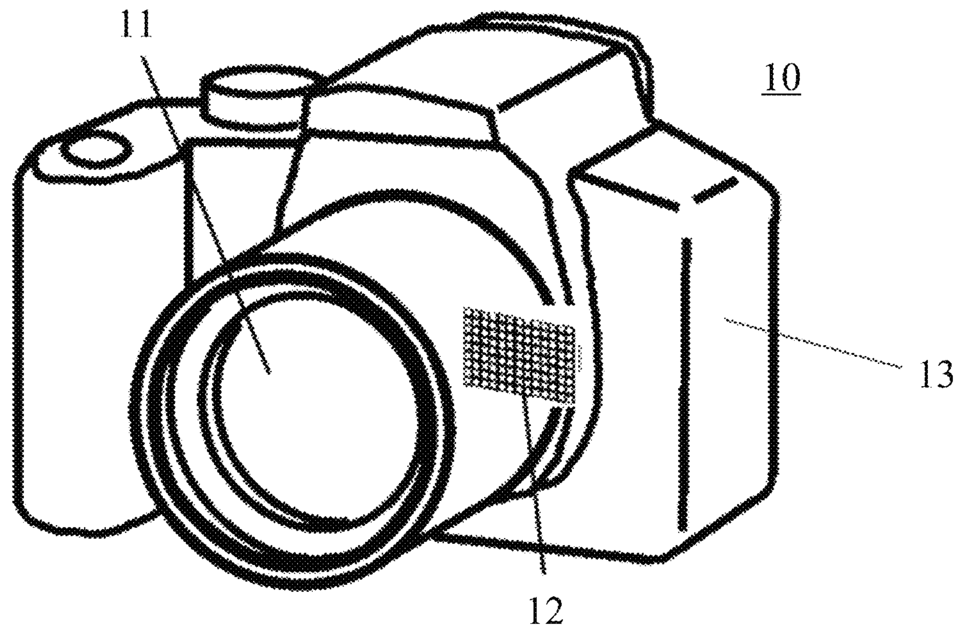
FIG. 16 is a schematic diagram of an image pickup apparatus according to this embodiment.

A description will now be given of an image pickup apparatus according to this embodiment. FIG. 16 is a schematic diagram of the image pickup apparatus (digital still camera) 10 according to this embodiment. The image pickup apparatus 10 includes a camera body 13, an optical system 11 corresponding to any one of the optical systems L0 according to Examples 1 to 7, and a light receiving element (image sensor) 12 configured to photoelectrically convert an image formed by the optical system 11.

The image pickup apparatus 10 according to this embodiment can obtain a high-quality image formed by the optical system 11 that has a wide angle, improved distortion-correcting ability, and an improved peripheral illumination ratio.

The light receiving element 12 can use an image sensor such as a CCD or a CMOS sensor. At this time, electrically correcting various aberrations such as distortion and chromatic aberration of an image acquired by the light receiving element 12 can also improve the quality of the output image.

The optical system L0 according to each example described above can be applied not only to the digital still camera illustrated in FIG. 16 but also to various optical apparatuses such as a film-based camera, a video camera, and a telescope. Furthermore, the camera may be of a lens integrated type or of a lens interchangeable type.

Lens Apparatus

Figure 17:
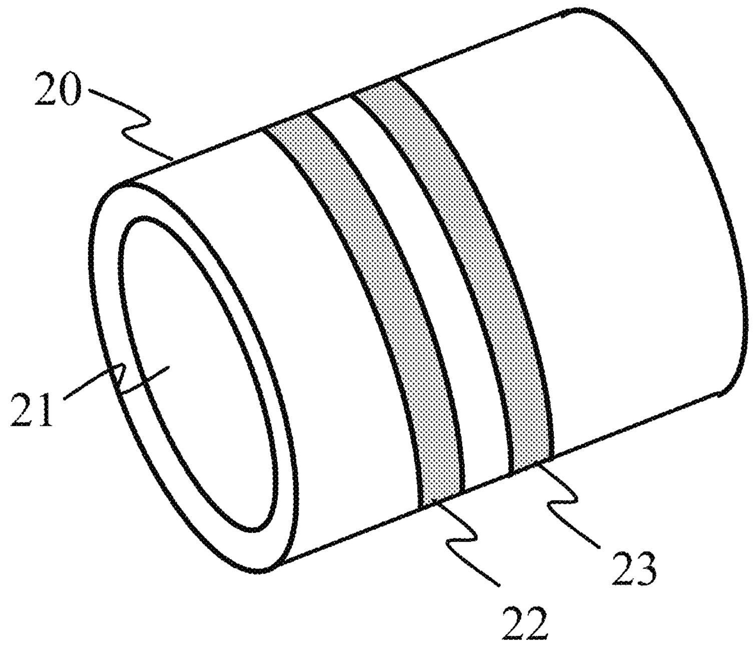
FIG. 17 is a schematic diagram of a lens apparatus according to this embodiment.

FIG. 17 is a schematic diagram of a lens apparatus 20 according to this embodiment. The lens apparatus 20 is a so-called interchangeable lens that is attachable to and detachable from an unillustrated camera body.

The lens apparatus 20 includes an imaging optical system 21 corresponding to any one of the optical systems L0 according to Examples 1 to 7. The lens apparatus 20 includes a focus operation unit 22 and an operation unit 23 for changing an imaging mode.

In a case where the user operates the focus operation unit 22, the arrangement of the imaging optical system 21 is mechanically or electrically changed, and a focus position is changed.

In a case where the user operates the operation unit 23, the arrangement of the lens units in the imaging optical system 21 may be changed for purposes other than focusing. For example, the aberrations of the imaging optical system 21 may be changed by mechanically or electrically changing the arrangement of the lens units of the imaging optical system 21 as the operation unit 23 is operated. In this case, the focus position may not substantially change.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide an optical system that has a wide angle and reduces the manufacturing difficulty of a lens disposed on the object side.

This application claims priority to Japanese Patent Application No. 2023-063719, which was filed on Apr. 10, 2023, and which is hereby incorporated by reference herein in its entirety.

What is claimed is:

1. An optical system comprising, in order from an object side to an image side:

a first lens having negative refractive power;

an aperture stop configured to determine an on-axis ray;

a second lens having positive refractive power;

a third lens having positive refractive power; and a fourth lens having negative refractive power, wherein a first lens surface on the object side of the first lens is aspheric, and the first lens surface has an area in which a curvature that is convex toward the object side increases from a central portion to a peripheral portion, and wherein the following inequalities are satisfied:

$$-1.50 \leq f2/f1 < -0.20$$

$$-2.40 < f4/f < -0.80$$

$$0.05 < x1/T < 0.80$$

where f1 is a focal length of the first lens, f2 is a focal length of the second lens, f is a focal length of the optical system, f4 is a focal length of the fourth lens, T is a distance on an optical axis from the first lens surface to the aperture stop, and x1 is a distance in an optical axis direction from a position on a reference spherical surface that passes through a surface vertex of the first lens surface separated from the optical axis by a distance of 3×T/2 and a position on the first lens surface separated from the optical axis by a distance of T/2 in a direction orthogonal to the optical axis, and a position on the first lens surface separated from the optical axis by a distance of 3×T/2 in the direction orthogonal to the optical axis.

2. The optical system according to claim 1, further comprising an aperture stop configured to determine an on-axis ray and disposed between the first lens and the second lens.

3. The optical system according to claim 2, wherein the following inequality is satisfied:

$$0.08 < T/TTL < 0.25$$

where TTL is a distance on an optical axis from the first lens surface to an image plane, and T is a distance on the optical axis from the first lens surface to the aperture stop.

4. The optical system according to claim 1, wherein the following inequality is satisfied:

$$0.40 < Dsum/TTL < 0.85$$

where TTL is a distance on an optical axis from the first lens surface to an image plane, and Dsum is a total thickness of lenses included in the optical system.

5. The optical system according to claim 1, wherein the following inequality is satisfied:

$$-3.50 < f1/f < -0.80.$$

6. The optical system according to claim 1, wherein the following inequality is satisfied:

$$0.40 < f3/f2 < 1.50$$

where f3 is a focal length of the third lens.

7. The optical system according to claim 1, wherein the optical system comprises, in order from the object side to the image side, the first lens, the second lens, the third lens, the fourth lens, and a fifth lens having positive refractive power.

8. The optical system according to claim 7, wherein the following inequality is satisfied:

$$0.001 < f/f5 < 1.500$$

where f5 is a focal length of the fifth lens.

9. The optical system according to claim 7, wherein the optical system comprises, in order from the object side to the image side, the first lens, the second lens, the third lens, the fourth lens, and the fifth lens, and a sixth lens.

10. The optical system according to claim 9, wherein the optical system consists of, in order from the object side to the image side, the first lens, the second lens, the third lens, the fourth lens, and the fifth lens, and a sixth lens having negative refractive power.

11. The optical system according to claim 9, wherein the optical system consists of, in order from the object side to the image side, the first lens, the second lens, the third lens, the fourth lens, the fifth lens, and a sixth lens having positive refractive power.

12. The optical system according to claim 9, wherein the optical system consists of, in order from the object side to the image side, the first lens, the second lens, the third lens, the fourth lens, and the fifth lens, a sixth lens having positive refractive power, and a seventh lens having negative refractive power.

13. The optical system according to claim 1, wherein a lens surface on the object side of the fourth lens is concave.

14. The optical system according to claim 1, wherein a lens surface on the object side of the second lens has a concave shape toward the object side.

15. The optical system according to claim 14, wherein the following inequality is satisfied:

$$-3.00 < (G2R2 + G2R1)/(G2R2 - G2R1) < -0.40$$

where G2R1 is a radius of curvature of a lens surface on the object side of the second lens, and G2R2 is a radius of curvature of a lens surface on the image side of the second lens.

16. The optical system according to claim 1, wherein the following inequality is satisfied:

$$-10.00 < G2R1/f < -0.80$$

where G2R1 is a radius of curvature of a lens surface on the object side of the second lens.

17. The optical system according to claim 1, wherein the following inequality is satisfied:

$$-1.50 < f/\text{fair} < 0.00$$

or $$0.00 < f/\text{fair} < 0.30$$

where fair is a focal length of an air lens including a second lens surface on the image side of the first lens, a third lens surface on the object side of the second lens, and an air gap between the second lens surface and the third lens surface.

18. The optical system according to claim 1, wherein the following inequality is satisfied:

$$-1.00 < f23/f1 < -0.10$$

where f23 is a combined focal length of the second lens and the third lens.

19. The optical system according to claim 1, wherein the first lens is made of plastic resin, and wherein the following inequalities are satisfied:

$$1.5 < n1 < 1.6$$

$$45 < vd1 < 65$$

where n1 is a refractive index of the first lens, and vd1 is an Abbe number of the first lens.

20. The optical system according to claim 1, further comprising a final lens disposed closest to an image plane among lenses included in the optical system and made of plastic resin, wherein the following inequalities are satisfied:

$$1.58 < nR < 1.75$$

$$15 < vdR < 30$$

where nR is a refractive index of the final lens, and vdR is an Abbe number of the final lens.

21. The optical system according to claim 1, wherein a lens included in the optical system has an aspherical shape on at least one of a lens surface on the object side and a lens surface on the image side, and is made of plastic resin.

22. The optical system according to claim 1, wherein a lens surface on the object side of a final lens disposed closest to an image plane among lenses included in the optical system has a stationary point, and a shape that is convex near an optical axis and concave at a peripheral portion, and wherein a lens surface on the image side of the final lens has another stationary point, and a shape that is concave near the optical axis and convex at a peripheral portion.

23. The optical system according to claim 22, further comprising an aperture stop configured to determine an on-axis ray and disposed between the first lens and the second lens, wherein the following inequality is satisfied:

$$0.25 < h/TR < 0.65$$

where h is a distance in a direction orthogonal to the optical axis from the optical axis to the stationary point on the lens surface on the image side of the final lens, and TR is a distance on the optical axis from the aperture stop to the lens surface on the image side of the final lens.

24. An image pickup apparatus comprising:

an optical system; and an image sensor configured to receive an image formed by the optical system, wherein the optical system includes, in order from an object side to an image side:

a first lens having negative refractive power;

an aperture stop configured to determine an on-axis ray;

a second lens having positive refractive power;

a third lens having positive refractive power; and a fourth lens having negative refractive power, wherein a first lens surface on the object side of the first lens is aspheric, and the first lens surface has an area in which a curvature that is convex toward the object side increases from a central portion to a peripheral portion, and wherein the following inequalities are satisfied:

$$-1.50 \leq f2/f1 < -0.20$$

$$-2.40 < f4/f < -0.80$$

$$0.05 < x1/T < 0.80$$

where f1 is a focal length of the first lens, f2 is a focal length of the second lens, f is a focal length of the optical system, f4 is a focal length of the fourth lens, T is a distance on an optical axis from the first lens surface to the aperture stop, and x1 is a distance in an optical axis direction from a position on a reference spherical surface that passes through a surface vertex of the first lens surface separated from the optical axis by a distance of 3×T/2 and a position on the first lens surface separated from the optical axis by a distance of T/2 in a direction orthogonal to the optical axis, and a position on the first lens surface separated from the optical axis by a distance of 3×T/2 in the direction orthogonal to the optical axis.

25. A lens apparatus comprising an optical system, wherein the optical system includes, in order from an object side to an image side:

a first lens having negative refractive power;

an aperture stop configured to determine an on-axis ray;

a second lens having positive refractive power;

a third lens having positive refractive power; and a fourth lens having negative refractive power, wherein a first lens surface on the object side of the first lens is aspheric, and the first lens surface has an area in which a curvature that is convex toward the object side increases from a central portion to a peripheral portion, and wherein the following inequalities are satisfied:

$$-1.50 \leq f2/f1 < -0.20$$

$$-2.40 < f4/f < -0.80$$

$$0.05 < x1/T < 0.80$$

where f1 is a focal length of the first lens, f2 is a focal length of the second lens, f is a focal length of the optical system, f4 is a focal length of the fourth lens, T is a distance on an optical axis from the first lens surface to the aperture stop, and x1 is a distance in an optical axis direction from a position on a reference spherical surface that passes through a surface vertex of the first lens surface separated from the optical axis by a distance of 3×T/2 and a position on the first lens surface separated from the optical axis by a distance of T/2 in a direction orthogonal to the optical axis, and a position on the first lens surface separated from the optical axis by a distance of 3×T/2 in the direction orthogonal to the optical axis.

26. An optical system comprising, in order from an object side to an image side:

a first lens having negative refractive power;

an aperture stop configured to determine an on-axis ray;

a second lens having positive refractive power;

a third lens having positive refractive power; and a fourth lens having negative refractive power, wherein a first lens surface on the object side of the first lens is aspheric, and the first lens surface has an area in which a curvature that is convex toward the object side increases from a central portion to a peripheral portion, wherein a lens surface on the object side of a final lens disposed closest to an image plane among lenses included in the optical system has a stationary point, and a shape that is convex near an optical axis and concave at a peripheral portion, and wherein a lens surface on the image side of the final lens has another stationary point, and a shape that is concave near the optical axis and convex at a peripheral portion, and wherein the following inequalities are satisfied:

$$-1.50 \leq f2/f1 < -0.20$$

$$-2.40 < f4/f < -0.80$$

$$0.25 < h/TR < 0.65$$

where f1 is a focal length of the first lens, f2 is a focal length of the second lens, f is a focal length of the optical system, f4 is a focal length of the fourth lens, h is a distance in a direction orthogonal to the optical axis from the optical axis to the stationary point on the lens surface on the image side of the final lens, and TR is a distance on the optical axis from the aperture stop to the lens surface on the image side of the final lens.

* * * * *